United States Patent
Wunderlich et al.

[11] Patent Number: 6,011,643
[45] Date of Patent: Jan. 4, 2000

[54] DEVICE WITH A LASER FOR IMAGE PRESENTATION

[75] Inventors: Joerg Wunderlich; Klaus Hiller, both of Gera; Frank Goepfert, Jena; Richard Wallenstein, Gruenstadt; Christhard Deter, Gera; Wolfram Biehlig, Jena-Cospeda; Juergen Kraenert, Jena, all of Germany

[73] Assignee: LDT GmbH & Co. Laser-Display-Technologie KG, Gera, Germany

[21] Appl. No.: 09/091,908

[22] PCT Filed: Oct. 31, 1997

[86] PCT No.: PCT/EP97/06024

§ 371 Date: Jun. 24, 1998

§ 102(e) Date: Jun. 24, 1998

[87] PCT Pub. No.: WO98/20385

PCT Pub. Date: May 14, 1998

[30] Foreign Application Priority Data

Nov. 7, 1996 [DE] Germany ............... 196 45 976
Nov. 7, 1996 [DE] Germany ............... 196 45 978

[51] Int. Cl.$^7$ ........................................ G02F 1/01
[52] U.S. Cl. ................. 359/279; 359/599; 359/452; 359/457; 359/202; 359/204; 359/618; 349/17; 353/69; 348/804; 348/746
[58] Field of Search ............... 359/618, 599, 359/452, 457, 279, 443, 559, 202, 204, 296, 264; 349/17; 353/69, 122; 348/804, 758, 746

[56] References Cited

U.S. PATENT DOCUMENTS

| | | |
|---|---|---|
| 3,650,608 | 3/1972 | Baker ....................... 353/69 |
| 4,035,068 | 7/1977 | Rawson ..................... 353/122 |
| 5,272,473 | 12/1993 | Thompson et al. ............ 345/7 |
| 5,485,225 | 1/1996 | Deter et al. ................ 348/804 |
| 5,534,950 | 7/1996 | Hargis et al. ............... 348/758 |
| 5,694,180 | 12/1997 | Deter et al. ................ 348/746 |
| 5,841,489 | 11/1998 | Yoshida et al. .............. 349/17 |

FOREIGN PATENT DOCUMENTS

| | | |
|---|---|---|
| 0 589 179 | 3/1994 | European Pat. Off. . |
| 195 01 525 | 4/1996 | Germany . |
| 195 08 754 | 9/1996 | Germany . |
| WO 96/08116 | 3/1996 | WIPO . |
| WO 96/31803 | 10/1996 | WIPO . |

OTHER PUBLICATIONS

XP 000085691 / Optical Engineering, Jan. 29, 1990, No. 1 "Perspective on techniques for enhancing speckled imagery" Firooz A. Sadjadi (pp. 25–30).

Patent Abstracts of Japan, Aug. 7, 1991, vol. 015, No. 309 (P-1235) Pub.No. 03 109591 May 9, 1991 (Sony Corp).

XP 000591804 / Proceeding of the IEEE, Bd. 84, Nr. 5, May 1, 1996 "Speckled Reduction in Coherent Information Processing" T. Iwai & T. Asakura (pp. 765–781).

*Primary Examiner*—Loha Ben
*Attorney, Agent, or Firm*—McAulay Nissen Goldberg Kiel & Hand, LLP

[57] ABSTRACT

In a device with a laser for image presentation in which the laser emits laser light of a defined coherence length L at a given wavelength $\lambda$ and in which there is arranged in the path of the laser light a first structure with which phase displacements can be carried out for individual photons of the laser light in accordance with a predetermined distribution, it is provided that the average path given by the ratio of the average root mean square of the phase displacement formed by the distribution and the magnitude of the wave vector $k=2\pi/\lambda$ of the laser is greater than the coherence length L multiplied by a factor of $1/(12)^{1/2}$.

24 Claims, 7 Drawing Sheets

DEVICE WITH A LASER FOR IMAGE PRESENTATION

BACKGROUND OF THE INVENTION a) Field of the Invention

The invention is directed to a device with a laser for image presentation in which the laser emits laser light of a defined coherence length L at a given wavelength $\lambda$ and in which there is arranged in the path of the laser light a first structure with which phase displacements can be carried out for individual photons of the laser light in accordance with a predetermined distribution.

b) Description of the Relevant Art

The best known and, at present, most commonly used devices for lasers for image presentation are laser printers in which the information to Le printed is written on a light-sensitive cylinder by means of a laser beam, this cylinder being supplied with toner at the locations illuminated by the laser light, and the toner is then transferred to the paper for printing.

Other devices such as that known, e.g., from DE 195 01 525 C1, use the laser for sequential illumination of picture points of a television picture on a screen. Due to the inertia of the eye, the individual light points are averaged so that an observer perceives the image information as a video picture.

In both types of devices, lasers are used in particular in order to achieve a high dot or point resolution which can be achieved substantially due to the extensive parallelism of the laser beams. A further advantage of the laser over other light sources is the high energy density which is advantageous primarily in video systems of the type mentioned above so that it is also possible to present an image with suitably high light density or luminance on a very large projection surface with screen diagonals greater than 1.50 m or even on cinema screens.

The advantages of the laser in this respect are based on the stimulated emission of photons which, however, also leads to a high coherence of the laser beam emitted by the laser. However, this characteristic of coherence which is positive in other respects is troublesome in the presentation of images because it can lead to interference structures which are manifested in the presented image as scintillating dots. These speckles, also called interference phenomena, corrupt the reproduced image and cannot be tolerated for optimum image presentation.

The general survey article "Speckle Reduction in Coherent Information Processing", Toshiaki lwai and Toshimitsu Asakura, Proceedings of the IEEE, Vol. 84, No. 5, May 1996, mentions various possibilities for reducing speckle. Of particular interest in this article is a graph which shows that the number of publications has increased steadily from 1970 to 1990, which is a clear indication that no satisfactory solution has yet been found for speckle reduction.

The general survey article contains theoretical calculations for speckle reduction. Also, various methods are mentioned in which the spatial or temporal coherence of laser beams is disturbed. In particular, the premise consists in that the speckles are blurred due to local or spatial changes in the laser beam so that the contrast of the speckles is reduced.

A local interference of coherence was also attempted in DE 195 015 25 C1, which was already mentioned, by means of a phase plate. This phase plate is located in the path of the laser and acts upon different partial beams of the laser beam with different phases in the order of magnitude of the wavelength. In particular, the individual areas on the phase plate for generating the various phase differences are stochastically distributed so that it should be assumed that the phases of the individual partial light beams are distributed in a manner similar to the light from conventional light sources.

It has been confirmed by experiments that an appreciable reduction in speckle is possible with a phase plate of this kind. However, it has been observed that the individual structures in the phase plate which lead to a phase displacement of suitable magnitude give rise to new diffraction phenomena. Light bundles of all diffraction orders must therefore by collimated through a lens, but the beam product of the laser light is slightly deteriorated by this diffraction. It has further been observed that the raster or grid of the phase plate was detectable in the projected image, which indicates that in spite of the phase plate the speckle contrast was possibly still high enough to be detected by the eye.

The disadvantage of the reduced beam product could be overcome, however, when a screen with scattering bodies in which different phase displacements are generated based on different path lengths by static scattering is used instead of a separate phase plate. But tests have shown that such screens with path length differences in the order of magnitude of several wavelengths for different photons of the laser beam do not lead to the desired successful elimination of speckle.

Thus, it could be assumed that the laser light in which speckles occur differs substantially in still other physical characteristics from the light of other light sources in which no speckles were previously observed. Another physical magnitude for characterizing a light source is coherence length. Standard light generally has substantially shorter coherence lengths than laser light.

It is reported in WO 96/08116 that a pulsed laser at a pulse time of 1 ps, that is, with a coherence length of 0.3 mm, exhibited a substantially reduced speckle contrast compared with illumination of the same screen by a He-Ne laser. However, it cannot be known, a priori, whether this observed effect is attributable to the reduced coherence length or to the special construction of the laser. In addition, although the coherence length is changed by the pulses, every pulse, in order that a suitable light density can be generated at all, contains a substantially higher photon density than in continuous operation, so that interference through a large number of photons should even be increased. The only effect that could facilitate speckle reduction is based on the greater spectral width $\Delta\lambda$. But, as can be worked out by the known equation $\Delta\lambda=\lambda^2/L$, where L is coherence length, and taking into account the fact that the width of the interference maximum is substantially proportional to the wavelength $\lambda$, this spectral broadening cannot explain the observed reduction during pulses according to the previous understanding of speckle formation.

In particular, the measurement data in WO 96/08116 still show a small speckle structure. If the interpretation that the speckle structures substantially depends on the selected coherence length is correct, it should be possible to generate a similar speckle pattern with other light sources as well, e.g., such as a gas discharge lamp with similar coherence length (1 ps corresponds to $L \approx 0.3$ mm). There is no knowledge of this aspect.

These considerations show that the occurrence of speckle is only poorly understood in practice, so that every method for speckle reduction relies essentially only on empirical knowledge.

This is disadvantageous in terms of technology in that a method for speckle reduction taken from the literature cannot necessarily be applied to different, even similar, devices. Due to the lack of a general teaching for the occurrence of speckle from which appropriate reduction mechanisms could be derived, it is even conceivable that a method for speckle reduction which happens to be effective in a prototype will cause insurmountable difficulties in large-scale manufacture. Thus, it cannot be assumed with absolute certainty that a sufficiently high reproducibility will be achieved with any of the known methods.

OBJECT AND SUMMARY OF THE INVENTION

The primary object of the invention is to improve a device of the generic type in such a way that an effective, universally applicable and reproducible speckle reduction is made possible.

This object is met by means of a phase displacement distribution of laser light in which the average path given by the ratio of the average root mean square of the phase displacement formed by the distribution and the magnitude of the wave vector $$k = \frac{2\pi}{\lambda}$$

of the laser is greater than the coherence length L multiplied by a factor of $$\frac{1}{\sqrt{12}}.$$

This solution is surprising. It would have been expected, based on DE 195 015 25 C1, that the mean phase displacement should be in the order of magnitude of a wavelength. No connection of any kind to coherence length can be derived from this reference.

As has already been stated, the findings known from WO 96/08116 for speckle reduction, however, could have led to the conclusion that the construction of the special laser type is responsible for the speckle reduction. In this connection, the above considerations have given rise to doubts about the Effectiveness of speckle reduction, since it would actually have to be expected, based on the high photon density and the phase equality, that there are always enough photons which are coherent in the same time interval.

The invention is characterized particularly in that the path differences generated by the phase displacement must generally be at least $$\frac{L}{\sqrt{12}},$$

wherein the teaching of WO 96/08116 provides no clue for this whatsoever.

This teaching is based on novel considerations which were necessary in order to suitably interpret the separate experimental findings. These will be presented in more detail hereinafter in connection with the embodiment examples. Most importantly, it turns out that, in order to realize this teaching, the small structures for changing the phase of partial beams which are required in DE 195 015 25 C1 can be avoided so that the invention can be used without the acknowledged disadvantageous diffraction phenomena caused by the small structures and the consequent impairment of the beam product.

Since this teaching was achieved based on general theoretical considerations concerning speckle formation in accordance with all of the experiments conducted in this connection, there is also no reason to doubt that this teaching can be transferred to very different devices such as laser printers, video devices or other devices for image presentation. The reproducibility of the speckle reduction according to the invention is therefore ensured as completely as possible.

As was already mentioned above, the phase displacements required according to the invention can be not only stochastically distributed, but can also follow a regular function course, which, above all, also clearly sets off the invention from the other speckle reduction methods found in the literature using stochastic blurring of the speckle structures. The phase displacements can also be realized by means of mirrors, for example, the arrangement of which causes different photons to travel different path lengths.

However, the device can also be realized in a very simple manner by means of a preferable further development of the invention in which the first structure is formed of transparent material containing stochastically enclosed particles with an elevated refractive index compared with the surrounding material, wherein the phase displacements are generated due to these differences in the refractive index.

Accordingly, the structure is possible, for example, with small transparent particles of increased refractive index within a material holding the particles together. In particular, commercially available materials can be used for manufacturing, for example, when providing the first structure in a screen, wherein the thickness of the screen must be selected in such a way, according to the invention, that the average root mean square of the phase displacement results in a path length which is greater than the above-indicated value of $$\frac{L}{\sqrt{12}}.$$

Thus, the thickness of the structure, that is, the path taken the laser light through this structure, can be selected in such a way that it is suitable for all possible materials to realize the teaching according to the invention. However, the selected index of refraction is an essential factor in determining the thickness, for example, of a screen. For practical applications, particularly in laser video systems with commercially available lasers, it has been shown that the thickness of the first structures can be realized within reasonable limits with dimensions up to several millimeters when, in accordance with a preferred further development of the invention, the difference in the refractive index of the particles relative to the surrounding material is greater than 0.1.

It is clear from the preceding considerations that the particles which lead to a stochastic phase displacement may also not be too large so that an adequate phase difference due to the refractive index or the path length difference can take place. In accordance with an advantageous further development of the invention, it is provided in this connection that the particles in the light propagation direction are smaller than 0.5 mm and, in particular, at least some of the particles are smaller than 0.1 mm.

It was already noted above that the first structure should have only a small extension in the direction of the laser light. To this end, it is provided in a preferred further development that the first structure contains mirrors for increasing the phase displacement by way of lengthening the wavelength of the laser light.

In another preferred further development of the invention, a screen is provided for image presentation, wherein the first structure is arranged at least partly in the screen itself or is arranged in a layer of the screen.

As a result of this further development, the configuration of the first structure is not constrained by the necessity of preserving the beam product of the laser beam. Thus, a greater number of degrees of freedom is obtained for providing the first structure. In this respect, the region of the screen is not critical, since a screen, for example, in a video system, should itself scatter so that an observer can see the video picture from different directions and a reduction of the beam product is even required in a screen.

Particularly small first structures are sufficient when the coherence length itself is very small due to the features according to the invention. Therefore, in accordance with an advantageous further development, it is provided that the laser is a pulsed laser which can be operated with a pulse time of lees than 10 ps pulse width. The coherence length is conventionally calculated by multiplying the pulse time by the light velocity; that is, in a laser of this kind, the coherence length is 3 mm. This means that with pulse times of less than 10 ps the first structure can be realized generally within a few centimeters or less.

For such small coherence lengths for the purpose of appreciably reducing speckle, it is advisable to use lasers with an amplification bandwidth of greater than 100 GHz and, in particular, greater than 300 GHz.

It has been shown particularly in a video system that a substantial improvement can also be achieved if the pulse width, and accordingly the coherence length, is selected substantially smaller. Consequently, in a preferred further development of the invention, it is provided that when the device has a laser for red, blue and/or green light, a pulsed laser is provided for at least one of these colors, wherein this pulsed laser can be operated with a pulse width that is less than 4 ps and especially less than 2 ps if this laser emits red light;

3 ps and especially less than 1.5 ps if this laser emits green light;

2 ps and especially less than 1 ps if this laser emits blue light.

As can be seen from this further development, coherence lengths in the order of magnitude of up to 0.3 mm are accordingly obtained. This likewise has the advantage that the first structure can have very small dimensions.

However, in this connection, an unexpected further advantage has been found especially in video systems which have optical elements in the path of the light beam. In view of these optical elements, it is to be expected that these optical elements will likewise result in small phase differences for photons at different locations; that is, given a suitable configuration of such optical elements as a first phase-shifting structure, corresponding separate structure elements for realizing the phase differences according to the invention can be dispensed with.

An optical system understood in this sense could be, for example, expansion optics or a Fresnel lens in the beam path preceding the screen, which are originally used for other purposes, e.g., for the purpose of large-angle deflection of a laser beam which scans in accordance with a video standard.

An appropriate choice of coherence length is essential for carrying out the invention. As can be confirmed by means of a Fourier transformation of a finite wave train of length L in a vacuum, a finite wavelength always denotes a spectral width $\Delta\lambda$ which relates to the coherence length L based on the equation $$L = \frac{\lambda^2}{\Delta\lambda}.$$

However, it is not necessarily required, a priori, that every spectral width $\Delta\lambda$ results in a reduced coherence length. Unexpectedly, although understandably in view of the model which was already mentioned above and which will be discussed at length hereinafter, it is sufficient if the spectral width $\Delta\lambda$ is selected so as to be suitably large that the coherence length given by the width can be realized according to the invention.

In this respect, the device has, in accordance with a preferred further development of the invention, a second structure by means of which, based on local quantum mechanical disturbances of photons in the laser beam, the coherence length can be shortened, particularly by means of increasing the spectral width $\Delta\lambda$ of the wavelength spectrum of the laser. Accordingly, the coherence length given by the equation $$L = \frac{\lambda^2}{\Delta\lambda}$$

is reduced by increasing the spectral width $\Delta\lambda$.

It is known that a photon spectrum can be broadened by energy donation in molecules or atoms in a material traversed by light. The corresponding effects, for example, the Raman effect, are generally minor, so that they can be used only to a limited extent for increasing the spectral width.

However, more extensive analyses have shown that local quantum mechanical disruptions can also be produced with special, suitably configured structures. However, in order to understand the effects taking place in this respect, more exhaustive theoretical analyses are necessary and will be discussed more thoroughly hereinafter with reference to the embodiment examples.

The fundamental principle of such structures which is employed consists in that photons in the laser beam are temporarily or occasionally localized in a narrow range, so that a slight spectral broadening results due to the uncertainty principle. With a suitable number of such disturbances which are anticipated based on quantum mechanics, a corresponding spectral width results by which a reduction in the coherence length can be effectively achieved by means of a broadening of the spectrum.

As in the case of pulse time, optimum values can be given for determined devices also with respect to the given width $\Delta\lambda$. According to a preferred further development of the invention, based on similar considerations is those regarding the pulse time, the width $\Delta\lambda$ of the spectral distribution with wavelength $\lambda$ given by the coherence length of the laser light or by means of the reduction with the second structure is greater than 0.5 nm.

According to this further development, the desired width $\Delta\lambda$ of the spectral distribution is not, however, achieved exclusively by means of a second structure. It is also possible to choose the lasers corresponding to the desired spectral width. In particular, fiber lasers are suitable as lasers with a high line width $\Delta\lambda$.

Since both the first and second structures can be realized based on differences in the index of refraction, it is also possible, according to an advantageous further development of the invention, to integrate the first and second structures in a common structure. Above all, very small structures for speckle reduction which can also be accommodated in a laser printer, for example, are achieved in this way.

In particular, in accordance with a preferable further development of the invention, it has proven advantageous for the second structure when the second structure has a plurality of phase-shifting bodies which are arranged in the light path and which have a smaller extension in the direction of the light path than twenty-times the wavelength and, in particular, than twice the wavelength. The line broadening resulting from quantum mechanical local disturbance is accordingly extensive enough that only a few bodies need be used for adjusting a width $\Delta\lambda$.

Due to the substantially Gaussian distribution as a result of the disturbance of an individual body, it can be expected that the total widening in a plurality of bodies increases only by the root of the number of bodies. However, this can be avoided. A substantially more effective line broadening can be achieved on the second structure, according to a preferred further development of the invention, in that the phase-displacing bodies are regularly shaped and are uniformly arranged at an interval at which the local quantum mechanical disturbances sum up in identical phase in the formation of a scattering matrix characterizing the disturbance of a plurality of bodies.

As is stated more fully hereinafter in the embodiment examples, the line width achieved by means of the second structure is proportional to the number of phase-shifting bodies and is not the root of this number. Thus, substantially fewer bodies are required for the adjustment of a desired width so that the second structure can be constructed much simpler and can be manufactured more economically.

As in the determination of the coherence length in pulsed lasers by means of the pulse width, optimum values can also be indicated for the line width. Consequently, in a preferred further development of the invention, when a laser is provided for red, green and/or blue light, the spectral width $\Delta\lambda$ for the individual colors is as follows:

$\Delta\lambda > 1.3$ nm for red light;

$\Delta\lambda > 0.9$ nm for green light;

$\Delta\lambda > 0.75$ nm for blue light.

The first structure can also be formed of sintered granulate. In particular, when the structures are formed of particles, it has proven most of all advantageous in a preferred further development of the invention when the grain sizes are smaller than 0.5 mm and, in particular, smaller than 0.1 mm.

For the integration of the first and second structure, it has proven especially advantageous when the particles are formed of at least two phases having different refractive indices. The second structure can also be realized with these phases, while the grains themselves take over the essential function of the first structure. The common or shared structure indicated above can accordingly be provided for the first structure and the second structure in a simple manner.

As was already discussed thoroughly in the preceding, the formation of the second structure in the image material formed of particles is optimum, in accordance with a preferred further development of the invention, when the extension of at least one region between two phase boundaries in the direction of the path of the laser light is less than 20 wavelengths and, in particular, less than 2 wavelengths.

With respect to the above requirement for a shared structure for the first and second structures, Teflon is particularly suitable according to an advantageous further development of the invention. Teflon is also available in the form of granulate which can be sintered. The indicated grain sizes of less than 0.5 mm can be achieved by standard processes. Further, the grains have so-called crystallites in the order of magnitude of up to 1 $\mu$m diameter which are embedded in an amorphous phase. The order of magnitude of $\approx 1$ $\mu$m also lead into the desired order of magnitude of somewhat more than two wavelengths for an optimum second structure. Accordingly, Teflon is a material by means of which the requirements for the structures can be effectively met.

For the characteristics of the Teflon material, reference is had in particular to the following publications C. J. Speerschneider and C. H. Li, "A Correlation of Mechanical Properties and Microstructure of Polytetrafluoroethylene at Various Temperatures" Journal of Applied Physics, Vol. 34, No. 10, October 1963, pages 3004–3007; Solomon Fischer and Norman Brown, "Deformation of Polytetrafluoroethylene from 78 to 298° K. and the Effects of Environmental Grazing", Journal of Applied Physics, Vol. 44, No. 10, October 1973, pages 4322–4327.

Teflon is also a good volume scatterer and is therefore suitable particularly as a screen material and leads to advantages with respect to a preferred further development of the invention in which the first structure is a screen or a layer of a screen. In an advantageous manner, the risk of impairment of the beam product due to the volume scattering of Teflon no longer plays a role when the screen is produced from Teflon.

In particular, it is also required of a screen that it have a certain scattering angle distribution so that the observer can look at a video picture from different directions, e.g., a video picture produced by a laser.

With respect to the construction of the screen, the following further developments follow on the basis of other considerations which are applicable in particular for small coherence lengths in the order of magnitude of millimeters and under.

In one of these further developments, it is provided that the thickness d of the screen or of the layer, as determined in the propagation direction of a laser beam emitted by the laser for imaging, is greater than a critical thickness $d_{crit}$ which is calculated from the mean distance b from interference maxima, known as speckle, generated by the laser beams at a surface of the layer or of the screen:

$$d_{crit} = \frac{b}{2\langle \tan(\theta) \rangle},$$

where $\langle \tan\theta \rangle$ is the mean value of the tangent of the scattering angle $\theta$ for a scattering angle distribution characterizing the deflection of the laser beam at the structures.

Thus, compared with the known prior art, an unexpectedly simple solution results in that the layer thickness or screen thickness is selected so as to be suitably large.

The indicated formula is based on the interpretation that light from speckles generated at a great depth is scattered at the structures provided at this depth, so that, in the interference minima at the surface of the screen, light likewise exits from the surface of the screen. The speckle contrast is accordingly effectively reduced. The equation for $d_{crit}$ given above follows from this idea in a simple manner as will be discussed more fully hereinafter. With substantially greater thicknesses of the screen or of the layer arranged on the screen with respect to $d_{crit}$, additional layers contribute to reducing the contrast of the speckle so that the speckle should be completely blurred.

This solution is very simple and can also be realized in a simple manner, which is ensured primarily by the following further developments.

The speckle size is substantially determined by the beam diameter. As can be calculated by simple observations based on interference optics (see M. I. Yoder, D. G. Youmans, "Laser Radar Wavelength Selection and Trade-offs", SPIE, Vol. 999, Laser Radar III (1988) pp. 72–83), a speckle size of $$\frac{\lambda S \tan\theta}{D}$$

is given at a distance S of the laser from the screen and with diameter D and a centroid wavelength λ of the laser spectrum. However, since the speckle size can not be greater than the diameter, such an estimate is only valid for the condition where $D^2 > \lambda S$.

In such cases, there is the teaching, according to a preferred further development of the invention, that at a distance L of the screen from the laser and with a diameter D and centroid wavelength λ of the laser beam emitted by the laser the equation $D^2 > \lambda S$ is true and the thickness or screen thickness is greater than $$\frac{\lambda S}{D \langle \tan\theta \rangle}.$$

This layer thickness can be roughly twice the size of $d_{crit}$, so that a substantially improved blurring of speckle, and accordingly a lower speckle contrast, is also expected.

In accordance with another preferred further development of the invention, the screen is characterized by a thickness d at which a function course of a contrast magnitude K(d) assumes a value of less than 0.20 and, especially, less than or equal to 0.05 depending on the thickness d, wherein this function course of the contrast value is measurable as an area over the occurring maximum light intensity $I_{max}$ and minimum light intensity $I_{min}$ which is uniformly illuminated by the laser beam at a respective layer thickness d on a surface of the screen.

This thickness is also much greater than $d_{crit}$ according to the experience. However, a substantially lower speckle contrast is expected. But, in addition to the above-mentioned physical characterization of the speckle contrast depending on thickness, the physiology of the eye is also taken into account in this further development. That is, it turns out that speckle below a contrast such as is defined above by the maximum light intensity and by the minimum light intensity is hardly perceptible by the eye at a value of 0.2 and is not at all perceptible at a value of 0.05 in particular. Accordingly, the layer thickness according to this further development is selected such that speckle is optimally eliminated since it is no longer detectable by the eye.

In order to apply the teaching according to the further development mentioned above, measurements of the function course can be taken to characterize various materials. However, in order to keep the effort expended on measurement within limits, the required thickness can also be estimated according to another preferable further development of the invention.

According to this further development, the thickness of the screen is equal to $$d_{crit} \cdot \frac{\log(f)}{\log K(d_{crit})},$$

where f is a number less than 0.20 and, in particular, less than or equal to 0.05 and $$K(d_{crit}) = \frac{I_{max} - I_{min}}{I_{max} + I_{min}},$$

is the maximum light intensity and $I_{min}$ is the minimum light intensity within a region on the screen which is uniformly illuminated by the laser on a screen with thickness $d_{crit}$.

All of the further developments of the invention mentioned above can be realized in a simple manner when the screen is made of sintered PTFE (polytetrafluoroethylene) (Teflon®).

In accordance with an advantageous further development of the invention, the screen thickness d is greater than 0.1 mm, especially greater than 1 mm and in particular even greater than 3 mm. With such thicknesses, no substantial speckle contrast was observed in different lasers of different coherence length. Surprisingly, however, it has turned out that the thickness is dependent upon the coherence length for complete blurring of a speckle contrast. An optimum thickness is given in dependence on the coherence length of the used laser light according to an advantageous further development of the invention in which the light of the laser has a coherence length L and the thickness D is equal to (0.04 cm * S)$^{1/2}$±25% or more. In particular, no speckle was observed in a Teflon® screen which was formed from a starting product in powder form with a grain size in the range of 20 μm to 800 μm to form a screen with a thickness of 4 mm and with light laser with a coherence length of 4 cm (according to the laser manufacturer's specifications).

BRIEF DESCRIPTION OF THE DRAWINGS

The invention is explained more fully in the following with reference to embodiment examples and to the drawings.

DESCRIPTION OF THE PREFERRED EMBODIMENTS

Figure 1:
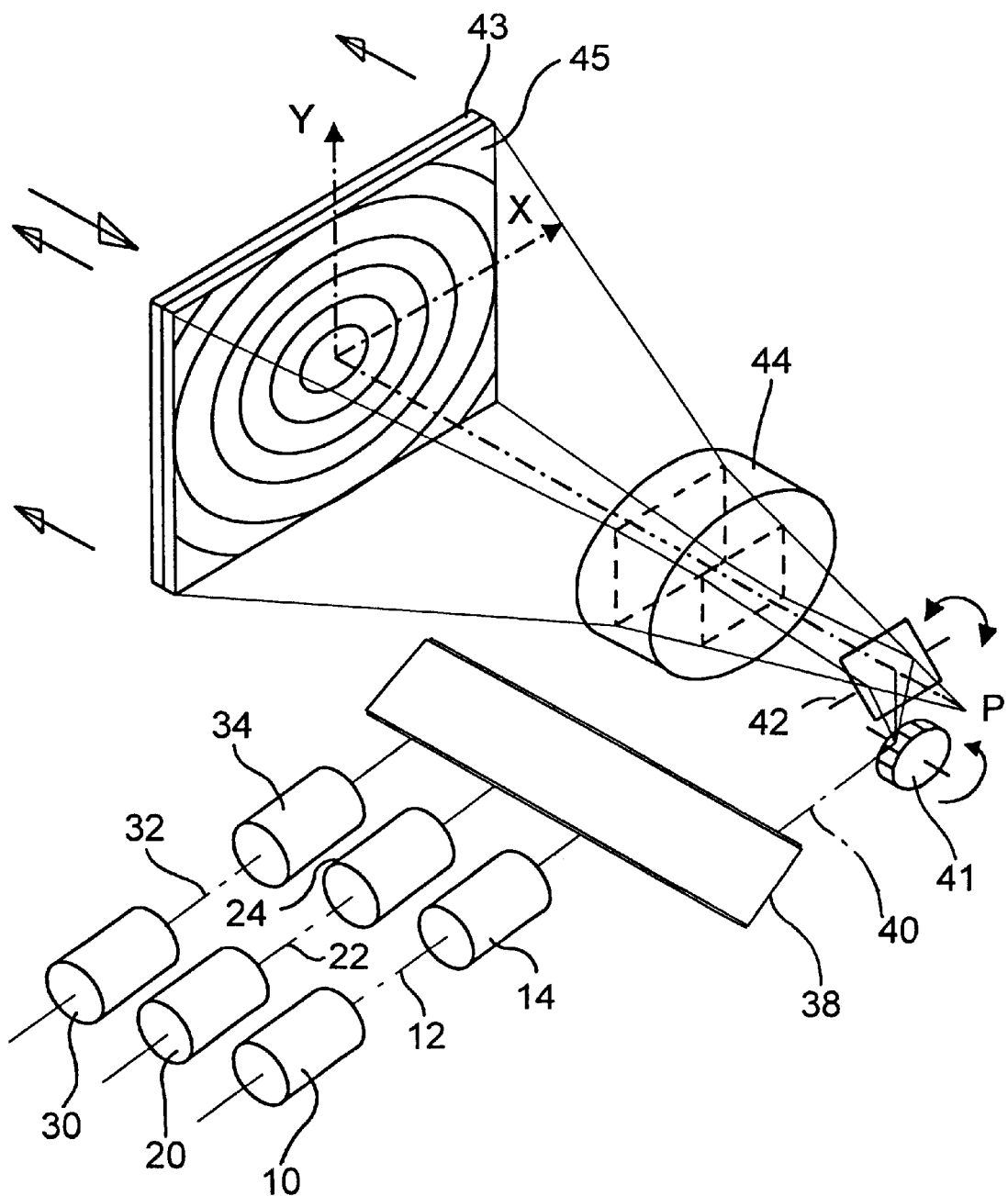
FIG. 1 shows a device with a laser for image presentation, presented by way of example in a video device.

FIG. 1 shows, by way of example, a device with a laser and a screen for showing pictures. In this embodiment example, color video pictures are generated. For this reason, there are provided not one, but three lasers 10, 20, 30 which emit light of a suitable wavelength of the primary colors for generating the picture points of a video picture. The laser beams 12, 22, 32 emitted by the lasers 10, 20, 30 are not yet modulated in the embodiment example for brightness control and color control of the picture points of a video picture, since gas lasers which cannot be controlled directly with the video frequency are used here for some analyses. When using laser diodes instead of gas lasers 10, 20, 30, the intensity of the laser beams 12, 22, 32 is changed directly by modulating the lasers with the information appropriate for the presentation of picture points.

Further, it has been shown that fiber lasers in particular are also advantageous for an economical speckle reduction due to their large spectral width as will be discussed again hereinafter.

However, for the purpose of modulation, spatial modulators 14, 24, 34 are arranged in the light path of the laser beams 12, 22, 32 for the gas lasers 10, 20, 30. The modulators comprise DKDP crystals, by means of which the polarization direction of the laser beams 12, 22, 32 is changed so that they are intensity-modulated by means of a following polarization filter depending on the control voltage. Further, the laser beams 12, 22, 32 are combined by a mirror system 38 to form a total light bundle 40 which is propagated through the rest of the system as a total light bundle 40.

The total light bundle 40 is deflected in two dimensions onto a screen 43 by a deflection device comprising a polygon mirror 41 and a swiveling mirror 42 for sequential illumination of individual picture points of the video picture to be generated on a screen 43. The corresponding color and brightness is provided for each picture point by means of the modulators 14, 24, 34.

The raster scanning technique used in laser television is known from television with picture tubes. The technique employed in the present instance differs from this, however, in that a total light bundle 40 is used instead of an electron beam and the magnetic deflection conventional in picture tubes is replaced by mechanical raster scanning by means of polygon mirrors 41 and swiveling mirrors 42.

However, raster scanning is not limited to the mechanical auxiliary means shown here. For example, this can also be carried out acousto-optically.

Further, FIG. 1 shows expansion optics 44 and a Fresnel lens 45 which are used in the embodiment example to achieve a large picture in spite of small deflection angles. However, these optical elements can also be configured in such a way that locally different phase displacements are generated by the Fresnel lens 45 or the lenses in the expansion optics 44, wherein the phase displacements are adapted to the coherence length of the laser in that they are similarly formed as will be made clearer hereinafter with reference to FIGS. 3 and 4.

Due to the coherence of the total light bundle 40 which is generated by means of lasers, it is extremely well suited for generating interferences. However, this characteristic of laser beams which is positive otherwise for interference optics or holography is extremely troublesome in a video projection device according to FIG. 1. This is because every small disturbance in the light path leads to interference phenomena which manifests itself as scintillating clots inside every picture point of the video picture, or speckle, as it is called. Speckles have a generally disturbing effect for the observer of the image and must be prevented or suppressed in every case if an acceptable video picture is to be achieved.

In the literature, the formation of speckles is usually described as single-photon interference and in optics is usually described by propagation of a single wave of a photon state in which simple waves are simply summed. However, a simplified view of this kind contradicts the following experimental findings:

1). Speckles are visible on a scattering screen, but not on a smooth, reflecting screen.
2). A scattering screen which has stochastic phase displacements in the order of magnitude of one or more wavelengths nevertheless exhibits a high speckle contrast.
3). A fiber laser which causes speckle on a screen in normal operation exhibits no speckle image below the output threshold for the stimulated emission.

The fact that these considerations concerning the simple addition of waves as known from single-photon interferences are contradictory is substantiated in particular hereinafter. In this connection, the quantities starting with lower case letters x, y or z refer to vectors.

With respect to 1): Assuming that, because of the high coherence of the laser, a photon proceeding from location $x1$ of the laser and a photon proceeding from location $x2$ of the laser are emitted each with the wavelength $k=2\pi/\lambda$, and these photons have a fixed phase relationship based on the stimulated emission, an interference term $$\cos\{k|z-x1|-k|z-x2|\}$$

would be given with a simple superposition of the waves at the location, specifically regardless of whether the screen reflects or scatters. This independence was not observable. Such an interpretation according to which a reflecting screen exhibits speckle would also contradict the Maxwell equations describing the light.

With respect to 2): As can be gathered from the indicated interference term, stochastic phase differences in the order of magnitude of a wavelength average out the interference term. This contradicts the observation that speckle can only be incompletely reduced with phase plates.

With respect to 3): The difference between non-lasing operation and lasing operation points to a density effect. In lasing operation, the photon density is substantially higher.

The conclusion reached from 3) indicates the probability of the existence of multiphoton interferences which are not mentioned at all in the literature relating to speckle phenomena. This may possibly have led to the fact that the problem of speckle has not so far been satisfactorily solved for image presentation.

Multiphoton interferences will be considered hereinafter by way of a model with reference to the simplest example of interferences of two photons. For this purpose, unimportant standardizing factors which change nothing as concerns the basic findings will be ignored. In the following, consideration will be given to the two-photon wave function $\psi_{12}$, whose absolute square indicates the probability of whether two photons are detectable at a common location or at different locations. A probability not equal to zero is an important prerequisite for the occurrence of any interference at all between two photons.

In the case of 1), the interference of two photons at different locations $x1$ and $x2$ from which the photons proceed with wave numbers $k1$ and $k2$ gives the following equation for the two-photon wave function:

$$\psi_{12}=e^{ik1|z-x1|}\cdot e^{ik2|z-x2|}+e^{ik2|z-x1|}e^{ik1|z-x2|}$$

The second term is given by symmetrizing the first term based on Bose statistics to which the photons are subject in quantum mechanics.

The probability of both photons stopping at location z can be calculated as follows:

$$\psi_{12}\psi_{12} = 2 + 2 \cdot \cos\{(k1-k2) \cdot (|z-x1|-|z-x2|)\}$$

When this expression is compared with the sum of the above-indicated wave function based on the unrealistic interpretation as single-photon interference, it will be seen that a possible interference depends on a spectral width (k1–k2) and no longer exclusively on the wave vector k itself. Namely, with high coherence laser light, that is, with a sufficiently small value of (k1–k2), the cosine equals 1, and there is no interference, i.e., no speckle, at the reflecting surfaces. With scattering structures in the light path, on the other hand, interferences can be generated as will become more clear in the following with reference to FIG. 2.

Figure 2:
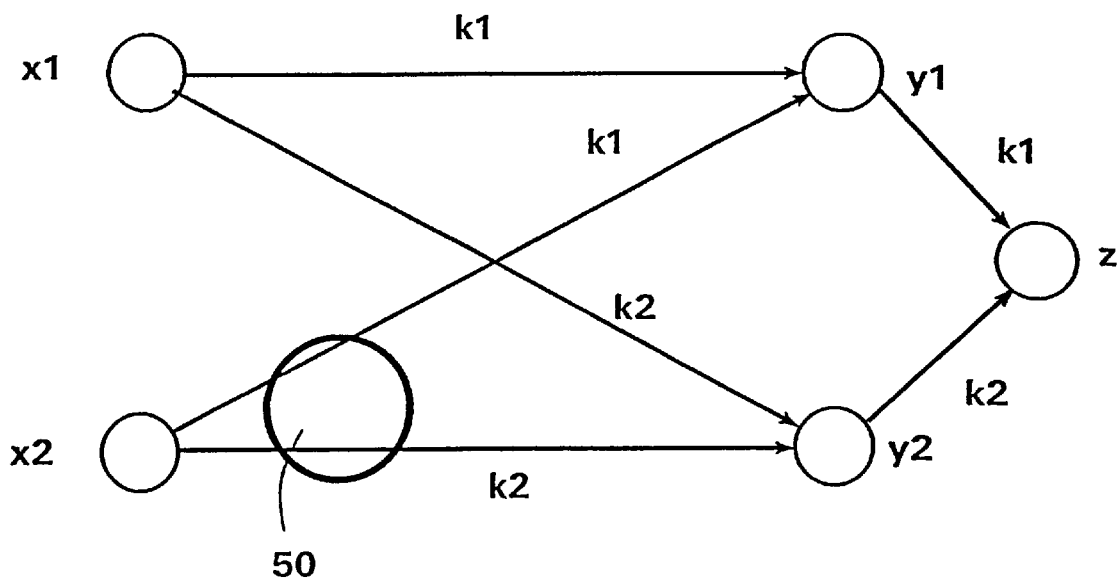
FIG. 2 shows a schematic view for explaining speckle formation and prevention thereof.

FIG. 2 shows two locations x1 and x2 and two locations y1 and y2 at which scattering bodies are located, for example, at two locations on the screen 43. The location where it is to be checked whether or not two photons are capable of interfering at all is again designated by z. This location z can be, for example, another scattering center in the screen 43 or also the retina in the eye of the observer.

In principle, in order to set up the two-photon wave function, all components originating from different photons which proceed from locations x1, x2 of the laser exit surface and pass through locations y1 and y2 to location z would have to be added. However, for purposes of comprehending speckle formation, the only terms of concern at present are those in which the photon state on the paths z–y1 and z–y2 is described uniquely by the wave numbers k1 and k2. In order to illustrate such a state, the individual path lengths in FIG. 2 are identified by the corresponding wave numbers k1 and k2.

The corresponding amplitude square leads to the following interference term of the two-photon wave function:

$$\cos\{k1|y1-x1|+k2|y2-x2|-k1|y1-x2|-k2|y2-x1|\} \qquad 1.0$$

The term is always 1 if x1=x2; that is, the photons capable of interference at location z are emitted in substantial measure from the same location on the laser exit surface and from locations at intervals at which the phase difference in expression 1.0 is a multiple of $2\pi$. That is to say, for two-photon interferences the laser exit surface is itself regarded as a structure due to which interferences can take place.

For further observations, an approximation of the expression given above will be discussed which will provide information about the functional behavior of the interference term with respect to y1 and y2. For this purpose, it is assumed that the locations x1 and x2 lie on a plane which is located vertical to the drawing plane, and y1 and y2 are two locations on a plane which is parallel to this plane and which likewise extends vertical to the drawing plane, wherein these two planes are at a distance A from one another. Further, the location vectors x1, y1, x2 and y2 lie in the drawing plane and the quantities X1, X2, Y1, Y2 are the corresponding projected vector components on the planes containing locations x1, y1, x2, y2. With a very large distance A relative to components X1, Y1, X2, Y2, the following approximation can be used for any pair of components X and Y on the respective planes:

$$|x-y| \approx A + \frac{(Y-X)^2}{2A}$$

After averaging by x1 and x2, apart from a fixed phase, this averaging in the argument of the cosine gives:

$$k1Y1\frac{\langle X2-X1\rangle}{A} - k2Y2\frac{\langle X2-X1\rangle}{A},$$

wherein (X1–X2), as average of locations x1 and x2 of the laser exit surface, is approximately the diameter D of the laser beam.

The pairs of photons capable of interference thus originate essentially from distances on the screen which give whole-number multiples of $2\pi$ in the phase and which are thus at a distance from one another substantially in the order of magnitude of $$\frac{A\lambda}{\langle x2-x1\rangle}.$$

The light comprising pairs of photons coming from plane y can accordingly be compared substantially with a lattice with respect to the capability of interference. However, this can be partially cancelled by a possibly inhomogeneous scattering of scattering bodies which then results in speckle.

On the other hand, in a reflecting surface such widely separated interference maxima are recombined to form a total beam, so that this observation explains why speckle is observable only with scattering surfaces.

It is apparent that in the indicated expression 1.0 for the cosine, phase differences do not contribute at all from the path differences y1–z and y2–z. This shows that phase displacements in the order in the order of magnitude of the wavelength prior to the exit of the photons contributes only unsubstantially to this term. Thus, speckle based on multiphoton interference cannot be completely eliminated by means of a phase displacement in the order of magnitude of the wavelength in conformity with the observation.

Further, it can be concluded from this interpretation that a laser not operated in the range of stimulated emission no longer exhibits speckle: the observations for x1 and x2 in a plane are only applicable in a lasing laser, since only then is the phase state unequivocally determined at the exit surface of the laser. In the non-lasing state of a fiber laser, on the other hand, the origin locations x1 and x2 of the photons are shifted relative to one another in the direction of the glass fibers, so that x1 and x2 are located far apart in the propagation direction of the laser beam, for which reason the cosine expression can vanish by averaging as a result of integration by x1 and x2.

These model-based observations can facilitate comprehension of the speckle phenomenon in conformity to the experimental findings. Accordingly, a solution to the speckle problem is not yet found, a priori.

For reduction of speckle, it is now suggested that photons on different paths are subjected to suitable phase displacements. The location region 50 which is emphasized in FIG. 2 is to be observed for purposes of explanation. If a change in path length by an amount $\Delta A$ is effected in the vicinity of x1 at this location, so that the photons proceeding from x1 travel a longer path independent from the state with wave numbers k1 or k2, there would result an additional phase in expression 1.0:

$$(k1-k2)\Delta A.$$

That is, at a wavelength spectrum with a distribution of ΔA with a certain width $$> \frac{2\pi}{k1-k2},$$

the interference term 1.0 is averaged out and speckle should no longer be producible.

That is, for an effective speckle reduction, the following condition must be adhered to:

$$\Delta A > \frac{2\pi}{\Delta k} \qquad 1.1.$$

The greater the value of ΔA, the more effectively speckle is suppressed. In addition to the indicated expression of equation 1.1, a recommended lower threshold is also given in particular by $$\Delta A > 10 \cdot \frac{2\pi}{\Delta k}.$$

Considered more closely, however, it can be seen that the exact lower threshold for effective speckle reduction depends heavily upon the distributions which are effective for changing the path length. This will become still clearer in connection with the following examples.

Speckle reduction can also be provided at locations other than location 50. For example, as will be discussed in subsequent example, the screen can have a stochastically distributed path length with a Gaussian width ΔA. The statistical distribution at locations y1 and y2 then occurs twice, that is, since the width of Gaussian functions is summed quadratically, equation 1.0 gives:

$$\Delta A > \frac{2\pi}{\sqrt{2}\,\Delta k}.$$

Further, another threshold value for the coherence length at which effective speckle reduction takes place, is given by an equipartition of the phases, for example, at location 50. With an equipartition, as is well-known, the average root mean square is equal to the total width by $\sqrt{12}$, so that the following equation is true for an effective reduction of speckle for all possible distributions as the lowest threshold for a given width Δk of the laser light:

$$\Delta A > \frac{2\pi}{\sqrt{12}\,\Delta k}.$$

It is essential, however, with respect to all of these equations that the necessary increase in path length is always inversely proportional to Δk. The spectral width of a laser beam should therefore be as great as possible if an effective speckle reduction is to be achieved with small path lengths ΔA.

Lasers with a very large spectral width can be selected for this purpose, for example. In particular, fiber lasers have such a large spectral width that the path length differences ΔA required for speckle reduction can be maintained within reasonable limits in the millimeter range and under.

Further, suitably large widths also result in a pulsed laser depending on the pulse time. By Fourier transformation of a finite wave train of length L, the corresponding widening gives:

$$\alpha k = 2\pi/L \qquad 1.2.$$

However, this width should not be confused with the Gaussian width. This width of the finite wave train is obtained from the zeros of the Fourier transform.

In the present case, a Gaussian width can not be given in general. However, it must be assumed that a laser is not pulsed in an exactly square manner and that, therefore, the width obtained by Fourier transformation does not exactly correspond to the true spectrum. Therefore, a relationship in accordance with equation 1.2 is nevertheless true in practice. However, care should be taken in a general calculation of coherence lengths according to 1.2, since contributions below $\frac{1}{10}$ of the maximum intensity are still usable for effective speckle reduction as in the examples in FIG. 5 to FIG. 7.

For this reason, only the lowest possible threshold for the root mean square ΔA can be assumed for formulating the condition for the path length depending on the coherence length for reducing speckle. Namely, an effective speckle reduction should be expected in general for $$\Delta A > \frac{L}{\sqrt{12}}.$$

In general, however, it is true that the greater the value selected for ΔA, the more effectively the speckles are suppressed.

If the path length difference to be provided remains in the order of magnitude of several millimeters, a pulse time below 10 Ps, i.e., 3 mm path length in the pulse, is to be maintained as far as possible in accordance with the above equation during pulsed operation of the laser, In particular, the following values have resulted for the embodiment example of FIG. 1 in dependence on the color of the lasers 10, 20, 30:

4 ps and especially less than 2 ps for the red laser;

3 ps and in particular less than 1.5 ps for the green laser; and 2 ps and in particular less than 1 ps for the blue laser.

Since the spectral width is conventionally measured not in wave numbers, but rather depending upon the wavelength, the following relationship given by equation 1.2 through the known relationship of the wave number of the wavelength is also especially important:

$$L = \frac{\lambda^2}{\Delta\lambda}.$$

The spectral width Δλ of a laser at which a reduction of speckle s expected at given path length differences can also be determined in a simple manner by means of this expression. For the embodiment example of FIG. 1, the following optimum values are given with only small path length differences, for example, in order to be able to use a thin screen 43: Δλ>1.3 nm for red light, Δλ>0.9 nm for green light, and Δλ>0.75 nm for blue light. This corresponds to a coherence length of approximately 0.3 mm, so that it can be expected that an effective speckle reduction will be achieved with these values on a standard beaded screen for slide projection.

Such line widths are also possible in a simple manner with fiber lasers, for which reason they are preferred for the embodiment example in FIG. 1.

However, the projection of stereo images by means of different light polarizations is also planned for the future.

This can be generated by means of special spectacles and a separate presentation of an image for each eye of the observer with differently polarized light. However, in order for the polarization state to be maintained, the beaded screens mentioned above by way, of example must be dispensed with. Therefore, the required path length ΔA should be realized in another manner.

As was made clear above with reference to FIG. 2, a change in the path length can also be provided according to FIG. 2 at location 50 in order to reduce speckle.

Figure 3:
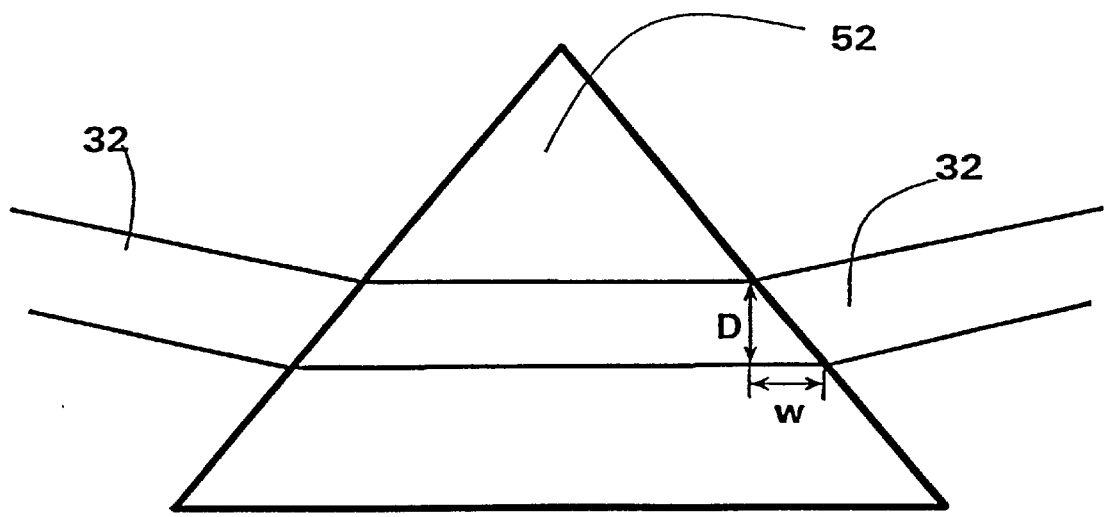
FIG. 3 shows a regularly shaped first structure for speckle reduction for a device according to FIG. 1.

An embodiment example for this is shown schematically in FIG. 3. This Figure shows a prism 52 which is arranged in FIG. 1 between the modulator 14, 24 or 34 and the combining device 38. The location of the prism 52 in front of the combining device 38 is particularly advantageous since no chromatic errors due to the prism which require correction and which could occur in an arrangement behind the combining device 38 due to different deflections of the laser beams 12, 22, 23 in the total light bundle 40 will then occur.

Depending on the location x1 or x2 of the photon in the laser beam with respect to FIG. 2, different phase differences are effected in a prism, wherein the phase differences can average out by taking the average according to equation 1.0 when the various phase differences due to the prism 52 are sufficiently large.

In the embodiment example of FIG. 3, the largest phase difference over the diameter D≈(x1−x2) of the laser beam 32 is, as is shown, $2w(n-1)$, where n is the index of refraction of the material. Accordingly, with glass, a right-angle prism, and a diameter of the laser beam of approximately D=2 mm, mean effective path length differences in the order of magnitude of 2 mm can be generated based on the phase displacement by means of the index of refraction from one flank of the laser beam 32 to the other. With a greater coherence length of the laser beam, the occurring speckle should accordingly be elliptically deformed, while stripes are expected with a substantially smaller coherence length.

The fact that the speckles are consequently not completely eliminated, but appear only as stripes is due to the fact that the phase displacements are effective only in one direction due to the prism 52. Different prisms 52, at least three such prisms 52, would have to be arranged in different directions in order to eliminate the speckle completely.

Figure 4:
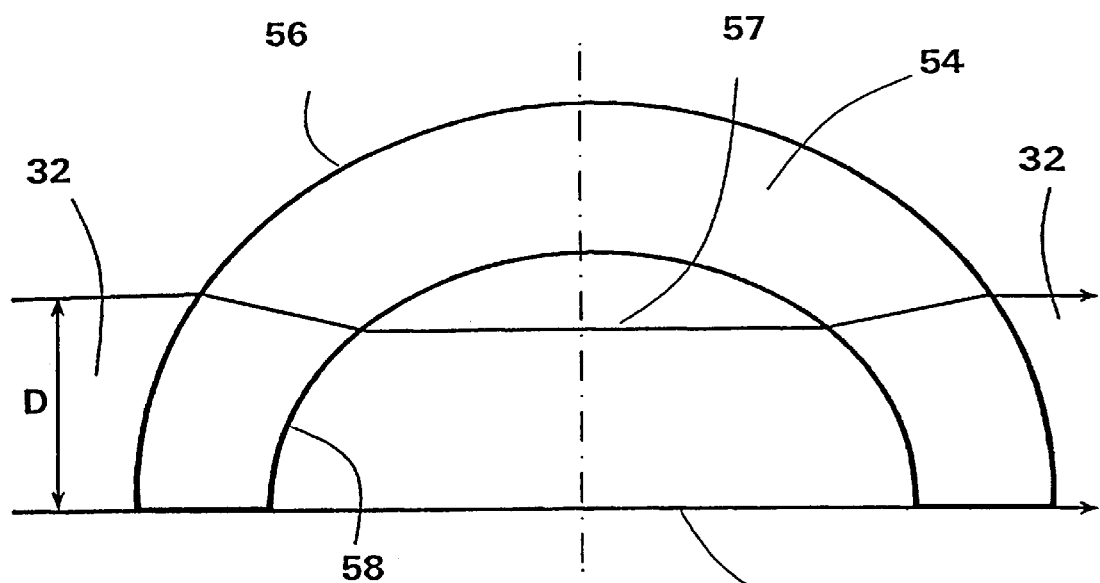
FIG. 4 shows another regularly shaped first structure for speckle reduction for a device according to FIG. 1.

On the other hand, in the embodiment example in FIG. 4, only a single element 54 is needed. This element 54 is constructed so as to be virtually symmetrical with respect to rotation as a dome with a surface 56 and a hollow space 57. The outer surface 56 and the inner surface 58 in the hollow space 57 are shaped in such a way that a refraction in the material of the element 54 leads to a course parallel to the equatorial plane 60. It is ensured in this way that the laser beam 32 retains shape when passing through the element 54. However, in this case, as in the example shown in FIG. 3, each individual photon travels a different path length depending on the location of entry into the optical element 54, resulting in effective phase displacements. It was estimated that with ratios similar in scale to those shown in FIG. 4 and a beam diameter of 2 mm, path length differences in the order of magnitude of several tenths of a millimeter can be achieved by means of this optical element, which is sufficient for the spectral widths indicated above which effectively reduce speckle.

Instead of the shape used in the example shown in FIG. 4, which is complicated to manufacture, a hemispherical shell of refractive material can also be used to reduce speckle in a simple manner if a beam expansion can be tolerated or, if necessary, the anticipated expansion of the laser beam can be corrected with a further optical system.

As was shown in the examples of FIG. 3 and FIG. 4, phase differences in the refractive materials are sufficient to achieve the corresponding change in path length. Such changes in phase are also to be expected from the Fresnel lens 45 and the expansion optics 44 and possibly even from the combining device 38. These devices can easily be in the range of several tenths of a millimeter, which, given a suitably selected coherence length of the laser, is sufficient for the construction as first structure for speckle reduction.

Figure 5:
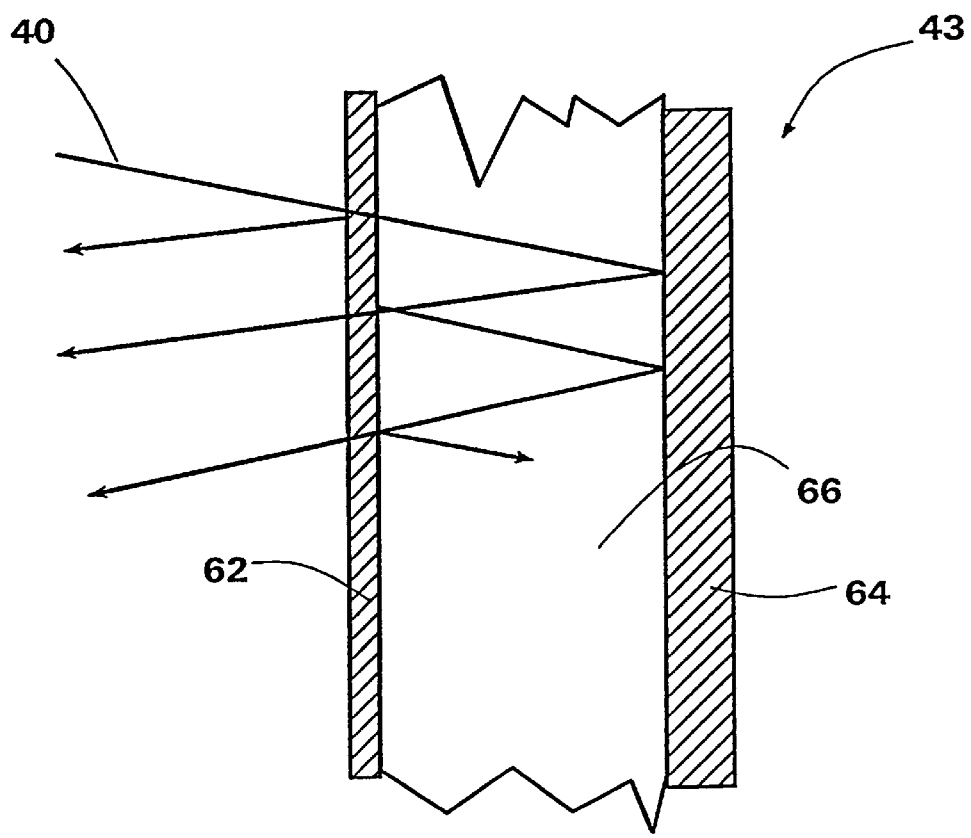
FIG. 5 shows a first structure 6 which can be provided, for example, in a screen and which makes it possible to show stereo pictures.

FIG. 5 is a schematic view of a screen 43 which is likewise suitable for presenting stereoscopic speckle-free images. However, the scattering structure for expansion of the solid angle for different observers is not shown for the sake of a simpler explanation of the principle of speckle reduction.

The screen 43 according to FIG. 5 is substantially formed of a partially transparent mirror 62 and another mirror 64. A light-refracting transparent material 66 is located between the mirror 64 and the semitransparent mirror and provides first for the stability of the screen 43 and, secondly, makes it possible for the mirror to be kept thinner at a given coherence length, since the index of refraction of the material 66 increases the desired phase changes.

The total light bundle 40 strikes the partially transparent mirror 62, wherein a portion of the light bundle is reflected back. Another portion strikes the mirror 64 and is reflected back so that different travel path lengths result. In particular, a distribution of the path lengths also results, since some partial laser beams are reflected multiple times as can be seen from FIG. 5. The desired path length difference accordingly occurs in the exiting light for preventing speckle.

A screen of the desired type can be formed, for example, from a glass sheet which is roughened on both sides and on which the mirrors 62 and 64 are deposited by evaporation. For thinner, lighter screens 43, a further possibility consists in commercially available, reflection-coated Mylar foil which can Le partially coated on the nonreflecting side. An unevenness for scattering the light in different directions can be effected by means of a local inhomogeneous heat treatment which distorts the Mylar foil in small areas.

A number of alternatives to the screen according to FIG. 5 are given, for example, by providing a screen comprising scattering bodies which, however, change the polarization of the light by scattering and therefore do not allow the presentation of stereo pictures.

In screens of this type, the picture screen can be fashioned from sintered granulate or can be made from phase-displacing bodies which generate a corresponding change in path length. In grains with a diameter δ, the different paths extend through the grain approximately between 0 and δ, so that maximum path length differences of $(\Delta n-1)\delta$ are expected with a difference in the index refraction Δn relative to the surroundings of the grain when passing through the grain, which corresponds to a root mean square path length change with an assumed equipartitioning of approximately $(\Delta n-1)\delta/12^{1/2}$. At a thickness d of the screen, the laser beam traverses approximately an average of d/δ grains. The root mean square deviations with respect to the path length, are added quadratically with a plurality of grains, so that a root mean square deviation of approximately $$\frac{\Delta n - 1}{\sqrt{12}} \sqrt{d\delta}$$

is expected with a thickness d of a screen 43.

Tests have shown that, in particular, Teflon which is sintered from a granulate and shaped to form a screen is well-suited for eliminating speckles. For Teflon, the expected index of refraction is in the range of 1.2 to 1.4.

In the above-mentioned tests for speckle reduction, screens 34 of Teflon® with average grain sizes of δ≈0.4 mm are used.

According to the equation indicated above, therefore, a Teflon screen of granulate with grain sizes of δ≈0.4 mm with an index of refraction of 1.4 and with a thickness of 4 mm, would generate path length differences corresponding to the root mean square of ΔA≈0.15 mm. This means that based on the theoretical considerations in connection with FIG. 2, a screen of this kind could eliminate speckle with laser light with a coherence length of ΔA·√12≈0.5mm.

Actually, it has been shown that the speckle in a screen of this kind, even at a coherence length of 4 cm according to the laser manufacturer's specifications, was no longer visible. This was not expected. While the above estimation for the quadratic path length difference is very rough, more precise calculations which also take into account different path lengths due to scattering at the grains, have shown that the estimated size is at most too small by a factor of 2 to 3. This means that there is still, in this case, a large discrepancy between the theoretically calculated coherence length at which the observed speckle reduction is possible and the specifications of the laser manufacturer with respect to coherence length.

Therefore, it is to be assumed that with Teflon there comes into play an additional effect by means of which speckle can be effectively eliminated. To explain this, the dependence of the coherence length was analyzed. With a fiber laser with a wavelength of approximately 500 nm and a spectral width of 2 nm, that is, a coherence length of approximately 0.2 mm, it was shown that the speckles were already no longer perceptible with a Teflon layer having a thickness of 1 mm. However, at this thickness, the laser with a coherence length of 4 cm still exhibited appreciable speckle phenomena. That is, the elimination of speckle is definitely effected depending on the coherence length and the model concepts indicated in more detail in the preceding should be applicable.

This discrepancy is resolved in the Teflon material itself. This is because Teflon has a very complex structure which is shown schematically in FIG. 6.

Figure 6:
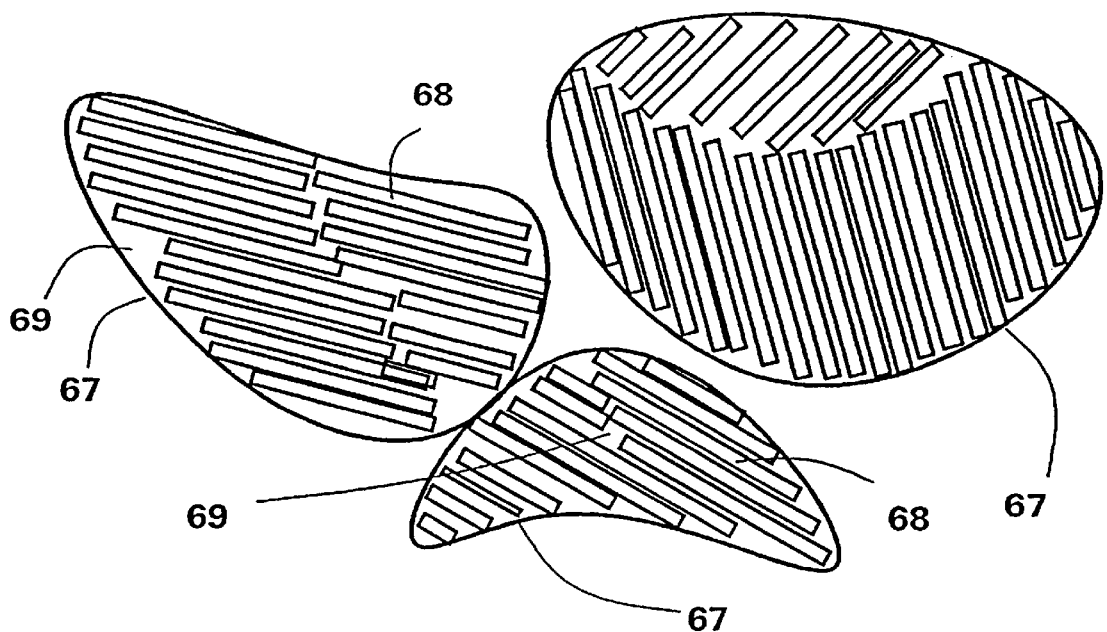
FIG. 6 shows a schematic view of structures in a Teflon® screen for a device according to FIG. 1.

FIG. 6 shows schematically the grains 67 of a Teflon screen to which the index of refraction of 1.2 to 1.4 indicated above is to be assigned. As is already known from the literature cited in the introduction, however, the grains 67 also have a structure. That is, the crystallites 68, as they are called, are embedded in these grains in an amorphous phase 69. In the Teflon material used, crystallites 68 with lengths in the order of magnitude of 100 μm at very small thicknesses of several micrometers to less than 1 μm were observed. Air (n=1) is enclosed between the crystallites 68.

Amorphous material 69 whose difference in refractive index with respect to the crystallites 68 should be in the order of magnitude of 0.1 based on independent measurements are located in the intermediate spaces between the crystallites 68. Due to the low index of refraction, however, no change in path length is to be expected from this second structure which is formed of crystallites 68 and from the amorphous material 69.

However, this second structure formed of crystallites and amorphous material can influence the coherence length based on the following considerations: As can be demonstrated by Fourier transformation, a wave has a defined wavelength only when this wave extends from negative infinity to positive infinity. However, in the event of some kind of disturbance, for instance, when the wave train is limited by a pulsed emission or when the quantum guided through the wave takes on another state in a locally defined spatial area, this is a matter of spectral broadening.

This characteristic has been expressed in the universally applicable uncertainty principle in which the wavelength of a material wave is linked to its momentum or impulse.

Thus, a wave which only extends over a defined spatial area, the coherence length, is always spectrally widened, as the following calculation shows. With an individual photon with a wave train of coherence length L and a wave vector $k_0$ whose wave is standardized to the photon number 1 with respect to the length L, the following equation is formulated:

$$\langle k_0 | x \rangle = \frac{1}{\sqrt{L}} e^{ik_0 x} \text{ for } -\frac{L}{2} \leq x \leq \frac{L}{2}, \text{ otherwise zero.}$$

In a known manner, with the operator $$\int \frac{dx}{\sqrt{2\pi}} \langle x | k \rangle = \frac{1}{\sqrt{2\pi}} \int_{-\infty}^{\infty} dx \cdot e^{-ikx}$$

the following expression is obtained in the k-space by Fourier transformation:

$$\langle k | k_0 \rangle = \frac{1}{\sqrt{2\pi L}} \cdot \frac{\sin(k - k_0) \cdot \frac{L}{2}}{k - k_0}.$$

Thus, a spectrum is obtained whose spectral width is determined by the coherence length L. This effect of spectral widening can be utilized by means of pulsed lasers as was already shown above.

The following distribution P will now be introduced for further considerations:

$$P(k, k_0) = |\langle k | k_0 \rangle|^2.$$

This equation describes, in a conventional manner, the probability of detecting a photon generated with the wave vector $k_0$ with wave vector k.

Further, the following remarks will serve as preamble for the sake of a better understanding of the coherence length.

In local space, the coherence length states the distance at which two photon states with a fixed phase relation can still interfere with one another, since interference presupposes a superposition of the amplitudes of two photons at the same location and at the same time. A similar interpretation is given in the k-space: a fixed phase relationship can only be maintained when two wavelengths have approximately the same wave number. When the spectral broadening is too great, any phase-dependent superposition is averaged out due to the rapidly changing phase relationship with respect to time.

This observation illustrates that maintaining a very short wave train has no bearing at all on a disturbance of coherence; rather, it is only a matter of how much the spectrum is widened. With two infinitely long waves with different wave numbers, the relative phases with travel path differences with a phase difference of 2π or a multiple thereof average out, so that a magnitude equivalent to the concept of coherence length, designated hereinafter as effective coherence length, can be formed for an optional spectral width.

In accordance with this observation, this effective coherence length L' can be calculated for every distribution by:

$$<k-k_0>_{coherence} \cdot L'2\pi.$$

As essential quantity in this connection is the mean value of the wave vector difference. However, this mean value must still be suitably defined.

With every distribution which drops sufficiently quickly toward infinity, a Gaussian width can be indicated as follows:

$$\langle k - k_0 \rangle^2_{Gauss} = \int_{-\infty}^{\infty} (k-k_0)^2 P(k) dk,$$

where $k_0$ is the mean value of the distribution k. However, this Gaussian width cannot be provided with the distribution calculated above, since the integrand still makes large contributions as a result of the term $\sin^2(k-k_0)L/2$ with large wave numbers k.

The reason for the occurrence of high wave numbers is given by the steep flanks at $\pm L/2$ in local space. However, this steep slope assumed for the calculation is not physically realistic. Therefore, it makes sense to carry out the integration up to a limited number of oscillations when carrying out the integral for calculating the Gaussian width. The resulting uncertainty with respect to the integration path can then be overcome as described hereinafter.

As was already stated, the value of the Gaussian integral is highly dependent upon the steepness with which the flanks rise and fall, which can be taken into consideration by means of a limited integration length. However, it can also be expected that the width to be taken into account for the coherence length changes depending on the shape.

Therefore, a shape factor f must be introduced by which different cutoffs at high frequencies are accounted for:

$$<(k-k_0)^2>_{coherence} = F<(k-k_0)^2>_{Gauss}.$$

With the previous equation for the probability distribution P, this gives:

$$\langle (k-k_0)^2 \rangle_{coherence} = \frac{1}{L^2}\left[\frac{1}{\pi}F\int_{cutoff} \sin^2 x \cdot dx\right].$$

The expression in the angled brackets no longer contains any physical quantities and can therefore only be considered as a cutoff-dependent constant, at least for infinitely large integration ranges.

In order to calculate the value for the angled brackets, a value for the shape factor F is still needed. But this can easily be derived with the help of the meaningful assumption that the effective coherence length L' in the assumed wave train above is equal to the actual coherence length L. Accordingly, it is found that with the indicated functional relationships the value of the expression in the angled brackets is equated with $(2\pi)^2$ so that L'=L.

The considerations mentioned above make it possible to eliminate the otherwise divergent integrals occurring in the following calculations and to obtain finite, physically meaningful results.

As was made clear from the calculations in the preceding, an effective coherence length, i.e., a length above which interference can no longer occur given the dissimilarity of two optional paths of a photon, is given with a finite wave train and/or with a finite spectral width.

This can be understood in accordance with quantum mechanics by means of the uncertainty principle. A broadening of a spectral distribution signifies a broadening of impulse which has an affect on a limited local uncertainty in the detection of a photon.

On the other hand, a condition of the uncertainty principle consists in that a broadening of impulse is to be expected because of the recording of the impulse by the measuring device in a spatially limited measuring process. Since the type of measurement process is unimportant as concerns the basic validity of the uncertainty principle, the essential physical process is not caused by the measuring device itself, but by the disturbance of the measured particle initiated by this measuring process. Then, analogous to the measuring process, a similar widening must be expected for every disturbance.

The following calculations can also be carried out completely without introducing the quantum mechanical impulse. Instead, the wave vector k is used throughout. These calculations nevertheless agree with the quantum mechanical interpretation, since k is proportional to the impulse of a wave by reason of Planck's law.

A particle with wave vector $k_0$ is detected with the amplitude:

$$<k|k_0>$$

as a particle with wave vector k. By transformation from local space, this can be calculated as:

$$\langle k | k_0 \rangle = \int_{-\infty}^{\infty} dx \langle k | x \rangle \cdot \langle x | k_0 \rangle,$$

where a local interference through the control matrix S is introduced as:

$$\langle x | k \rangle = \int_{-\infty}^{\infty} dx' S(x - x') \langle x' | k \rangle.$$

It will be seen from this equation that if the contribution of the scattering matrix S is only within a narrow spatial area different than 0, the amplitude $(k|k_0)$ then contains integrals similar to those that occurred in the spectrum for a finite coherence length. Therefore, a change in the effective coherence length is expected, also mathematically, with local interferences. Broadening of the spectrum through local interferences such as absorption and emission of a photon through molecules or atoms have been observed in experiments, for example, in the Raman effect, and will be considered in more detail hereinafter.

However, it can be concluded from the equations that a spectral broadening with smaller effective coherence length is also expected when the photon is locally in a state other than the emission state, but is then observable in the original state. For example, spectral broadening will also be expected when a photon passes through a locally defined body in which the photon has a somewhat different wave vector because of a refractive index other than 1.

On the basis of these considerations, the effective length can now be calculated in a thin individual body, namely in a photon with an amplitude A, with coherence length L and wave vector $k_0$ which, in a body at location x=b with a thickness a and with the refractive index n, has the wave vector $nk_0$. The state for a wave train of this kind is local space is accordingly:

$$\langle x \mid k \rangle = \begin{cases} Ae^{ikx} & \text{for } -\frac{L}{2} \leq x \leq b \\ Ae^{ikb}e^{ink(x-b)} & \text{for } b \leq x < b+a \\ Ae^{ikb}e^{inka}e^{ik(x-(b+a))} & \text{for } b+a \leq x \leq \frac{L}{2}. \end{cases}$$

In this equation, the phases were written as factors in such a way that it can be seen directly that the amount and phase at every boundary surface takes on the correct value so that the wave is constant. When the exponents are combined, this results in the following equation which simplifies the further calculations:

$$\langle x \mid k \rangle = \begin{cases} Ae^{ikx} & \text{for } -\frac{L}{2} \leq x \leq b \\ Ae^{i(1-n)kb}e^{inkx} & \text{for } b \leq x < b+a \\ Ae^{i(n-1)ka}e^{ikx} & \text{for } b+a \leq x \leq \frac{L}{2}. \end{cases}$$

For amplitude $$\langle k \mid k_0 \rangle = \int_{-\infty}^{\infty} dx \langle k \mid x \rangle \cdot \langle x \mid k_0 \rangle,$$

the following expression is given up to trivial factors such as A*A:

$$e^{in\Delta ka/2} \left\{ \frac{e^{-i\Delta ka/2} \sin[\Delta k(L+(n-1)a)/2]}{\Delta k} - \left(1 - \frac{1}{n}\right) e^{i\Delta kb} \frac{\sin\frac{n\Delta ka}{2}}{\Delta k} \right\} \quad 2.0,$$

where $\Delta k = k_0 - k$.

With the equations indicated above, the following simple relationship is obtained for the effective coherence length L' in the approximation a<<L based on the above remarks for determining the effective coherence length:

$$L' = \frac{n}{n-1} \sqrt{a \cdot L \cdot n}.$$

The effective coherence length is thus substantially shorter than the coherence length itself due to the interference. With very large coherence lengths, however, the effect is very small. The spatial interference given by the body with thickness a would have to act in areas substantially smaller than 1 μm in order to have a measurable effect.

When the action of a plurality of bodies is considered, a different assessment results. If the quantum mechanical scattering matrix for an individual body by which a quantum mechanical state with the wave vector $k_2$ is changed into a state with the wave vector $k_1$ is represented by $S_{1,2} = |k_1\rangle\langle k_2|$, then the following total matrix is given for m bodies:

$$S_{1,m} = \int\int \cdots \int\int S_{1,2} \prod_{j=2}^{m-1} S_{j,j+1} dk_j.$$

This integral can be simply stated under the following conditions. The length L is again assumed to be very large relative to the thickness of the body a, so that the sin ΔkL term in equation 1.0 can be approximated by a δ-function. Further, constant phases are left out of all S matrices, since only the absolute squares of the matrices are pertinent to these calculations. In different bodies, each of which is arranged at a distance $b_j$ from the null point, the amplitude $\langle k_{l+1}/k_1 \rangle$ can then be formulated in accordance with equation 2.0 with the correct standardization for carrying out the integration as:

$$\langle k_l \mid k_{l+1} \rangle = \delta(k_l - k_{l+1}) + e^{ib_l(k_{l+1}-k_l)} T(k_{l+1} - k_l).$$

In his connection, the Dirac function δ corresponds to the first summand containing sin (kL) and function T corresponds to the summand with the sin(ka) term in equation 2.0.

After integration, this gives the following for the amplitude:

$$\langle k_m \mid S_{m,1} \mid k_1 \rangle = \delta(k_m - k_1) + T(k_m - k_1) \sum_{j=2}^{m-1} e^{i(k_m - k_1)b_j}.$$

The integration is simplified substantially due to the dominant contribution of the δ-function. The summation through different bodies thus involves only an addition of the phases due to the different locations $b_j$ of the bodies of thickness a.

In order to calculate the spectral width through the wave vectors, it is now only necessary to calculate the following expression:

$$\int (k_m - k_1)^2 |\langle k_m \mid S_{m,1} \mid k_1 \rangle|^2 d(k_m - k_1).$$

The δ-function components do not contribute, rather only the sum squares over the phases. When the integral is evaluated, the integration over the phase sums gives the number m of bodies when the locations b of the individual bodies are randomly distributed. On the other hand, a value of $m^2$ is given, with the special choice that the path differences $b_j$ multiplied by the wave vector differ between the bodies by whole-number multiples of $2\pi$.

Thus, the following equation is given in general for the coherence length of m bodies:

$$L' = \frac{n}{n-1} \sqrt{a \cdot L \cdot n} \, \frac{1}{m_{\mathit{eff}}},$$

in which $m_{\mathit{eff}}$ is the effective number of bodies which, stochastically, is equal to the root of the number of bodies, but can increase by whole-number multiples of $2\pi$ up to a value of m depending on the selected distances of the bodies according to the indicated phase position.

The behavior of light in Teflon can accordingly be better understood because the effective coherence length in Teflon should be reduced according to these considerations because of the crystallites 68.

The above considerations were true for a body with an index of refraction n relative to a vacuum. In this case, however, only the difference in refractive index of the crystallites 68 relative to the amorphous material is important. Thus, with the measured value of 1.0 for the difference in refractive index, $$\frac{n}{n-1}$$

must be given the value of 10. The value for a below the root must be averaged because of the different position of the crystallites 69 relative to the light path and thickness. Due to the S-matrix dependence on 1/a, 1/a is used for averaging, that is, smaller thicknesses make the greatest contribution when averaging. A corresponding estimation based on the structure of Teflon shown schematically in FIG. 6 gives a≈2 μm.

However, on the average, at a length of 100 μm of the crystallites 68 only approximately sixty crystallites 68 lie in the path of the laser beam, so that $m_{eff}$ has an assumed value of roughly 8. With these values, for a coherence length of 4 cm of the laser beam 40 striking the screen 43 an effective coherence length of approximately 0.4 mm is given in Teflon in favorable correspondence with the above-mentioned estimated occurring average path length of approximately 0.5 mm for the experimental thickness of 4 mm for eliminating speckle.

There is a further result of the indicated equations. With materials with a similar second structure, the average phase difference depends on the root of the thickness. On the other hand, the change in coherence length over $m_{eff}$ depends on the reciprocal value of the root of the thickness, so that the condition L<ΔA for an effective speckle reduction at a given coherence length L gives a critical thickness $d_{crit}$ of $$d_{crit} = \sqrt{\kappa \cdot L},$$

above which an effective speckle reduction is possible.

In this connection, k is generally a material constant of the dimension of a length which includes the dependency on the index of refraction, differences of refractive indices, grain sizes, etc. This relationship makes it possible to measure the material constant at a coherence length and to estimate suitable thicknesses for other coherence lengths rather than carrying out complicated calculations with the above-mentioned parameters for materials which contain a first structure for generating the path length as well as a second structure for reducing the coherence length.

If there was no second structure in the screen 43, a root dependency would result for the root mean square deviation, so that $d_{crit} \sim L^2$ would be assumed.

A material constant of k=0.4 mm±25% was determined for the indicated Teflon with a 0.4 mm grain size. The large indicated error is primarily due to the fact that the thickness at which no speckle was observable any longer was determined subjectively.

Further, as is clear from the calculations indicated above, the coherence length can be distinctly effectively reduced when regular second structures are used in which a distance is maintained substantially from one body to the next body which is a whole-number multiple of the phase difference of 2π.

Figure 7:
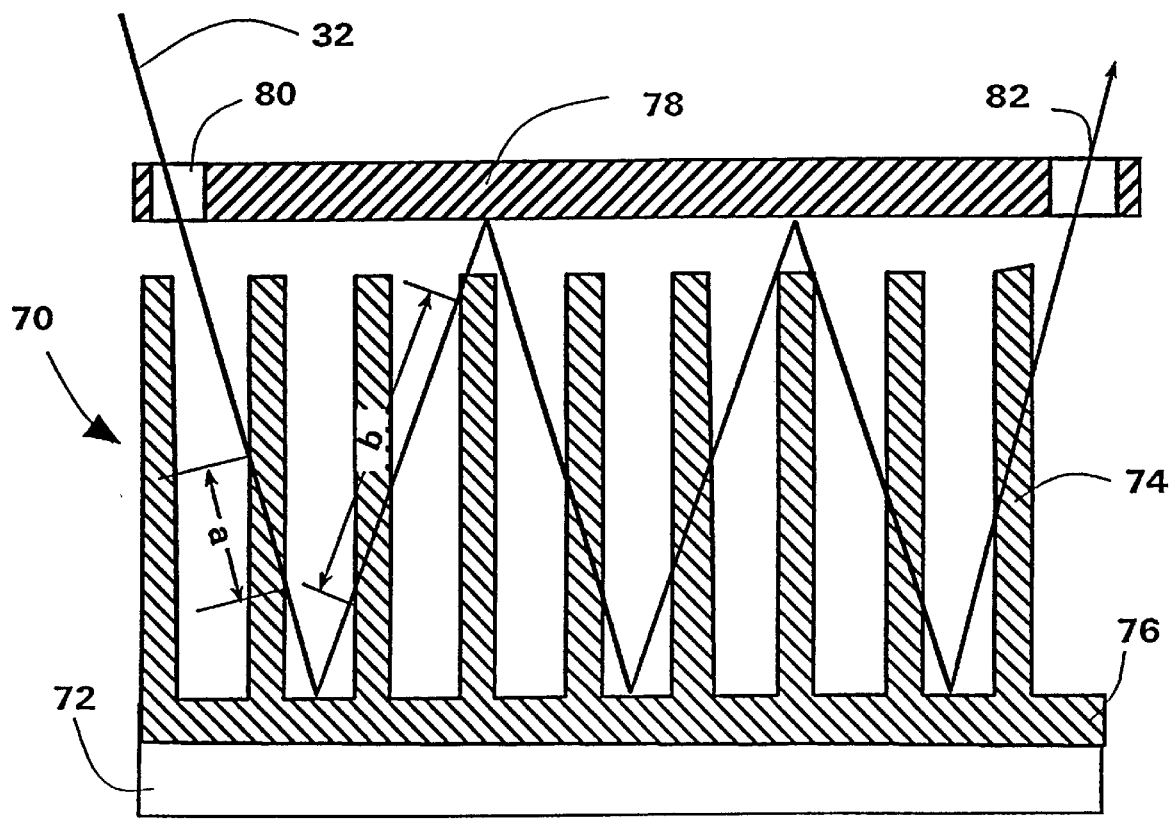
FIG. 7 shows a regularly shaped second structure for changing the spectral width of a laser beam.

A second structure 70 of this kind which is advantageously arranged in the video projection device according to FIG. 1 between modulators 14, 24, 34 and combining device 38 so that chromatic errors need not be taken into account is shown in FIG. 7. It will be explained more fully hereinafter with reference to FIG. 8 how these can be manufactured in particular.

The structure is formed of a silicon substrate 72 from which a plurality of bodies 74 were etched out. The silicon was subsequently oxidized so that the bodies 74 are formed of transparent silicon oxide. The oxidation time was selected in such a way that a silicon dioxide layer 76 is also formed on the substrate with a thickness by which this silicon dioxide layer 76 acts as a dielectric mirror for an incident laser beam 32.

Further, a mirror 78 is arranged above the structure 70 which reflects the laser beam 32 back and forth repeatedly in combination with the dielectric mirror 76. Two openings 80 and 82 through which the laser beam 32 enters and exits are provided in the mirror 78.

Further, distances a and b which relate to the above mathematical derivations are indicated in FIG. 7.

The dimensions in FIG. 7 are not shown true to scale, however. While the laser beam 32 can certainly have a diameter of several millimeters, the thicknesses of the bodies 74 are kept as far as possible in the order of magnitude of 2 to 20 wavelengths so that the coherence length is as small as possible in accordance with the above statements. Further, the height of the bodies 76 should be as large as possible so that the laser beam 32 passes as uniformly as possible through the second structure 74.

Figure 8:
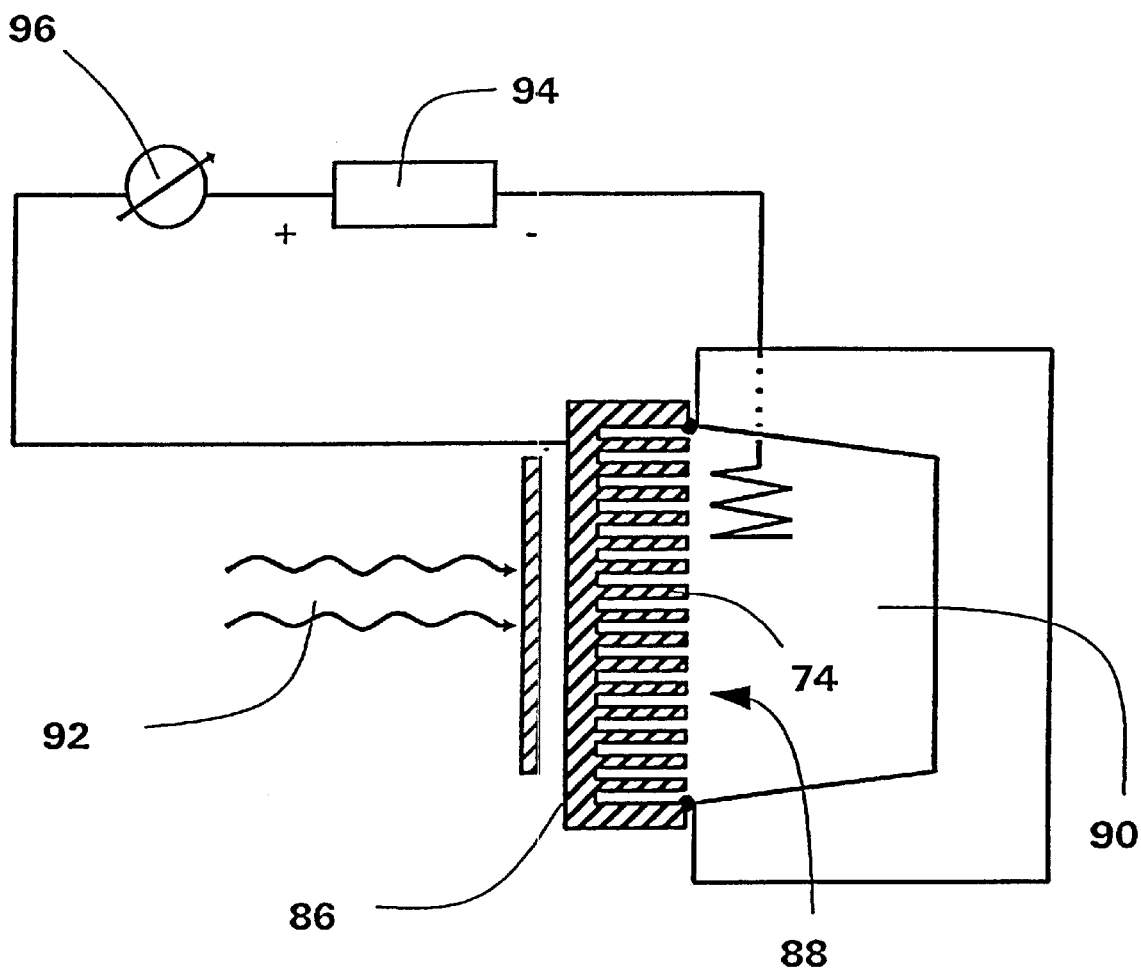
FIG. 8 shows a schematic view of a manufacturing process for the structure according to FIG. 7.

In "Photonic Band Structure in Macroporous Silicon [Photonische Bandstruktur in makro-porösem Silizium]", Physikalische Blätter 52, 1996, Nos. 7 and 8, pages 661–664, a process is indicated by which thicknesses of bodies of 2.3 μm with heights up to almost 0.1 mm can be produced. FIG. 8 serves to explain this process.

A highly n-doped silicon wafer 86 is given a structure on the surface, for example, by means of lithography. In the present example, in contrast to the article cited above which describes the production of micropores, it is necessary to form a striped pattern for generating a second structure to change the coherence length.

The bodies 74 are then etched out by electrochemical means in a liquid oxygen solution 90. The large heights with small widths of the bodies 74 are achieved in that etching is effected only at locations of high electron density in the silicon. In order to generate free electrons, the substrate is irradiated from behind by UV light 92. The highest electron densities are achieved where, initially, a depression has been generated for example, by means of lithography. The larger the depression, the greater the effect of the locally selective etching for forming the bodies 74'.

In order to avoid electropolishing the silicon wafer 86, small currents with voltages of 1 to 2 V are required which are adjusted by a potentiostat 94 and monitored by means of a measuring device 96. A characteristic line for advantageous current values and voltage values is indicated in the above-cited article.

The following possibilities for the construction of a screen are also given based on further considerations.

Figure 9:
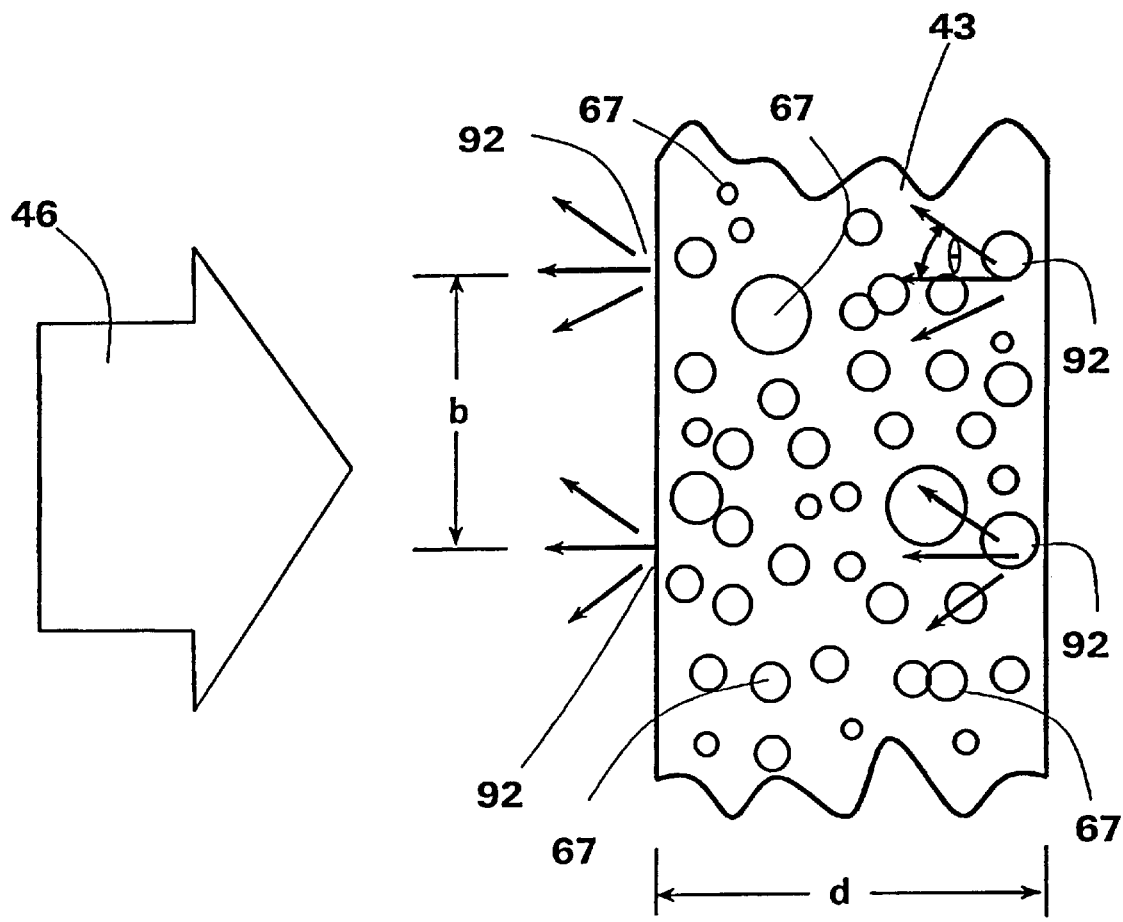
FIG. 9 shows a schematic view for describing the speckle contrast of a screen at a given layer thickness d.

As is known from interference optics, speckle size is given substantially by the dimensions of the interfering structures. In this connection, the dimensions of the smallest structure in the interference image are substantially given by the largest surface contributing to the formation of interference. Under the projection conditions in the embodiment example of FIG. 1, this surface is given by the beam diameter D of the laser beam. As is known from the literature cited above, it can be estimated that the speckle size should be given by $$\frac{\lambda S}{D},$$

where λ is the wavelength, S is the distance of the lasers 10, 20, 30 from the screen 43, and D is the diameter of the laser beam striking the screen. In FIG. 9, the occurrence of speckle 92 is indicated schematically in each instance by three arrows, wherein the interference phenomenon proceeds from the speckles 92 at different locations.

Since the scattering bodies 67 are uniformly distributed over the material of the screen 43, it is assumed that similar speckle images would arise in a section vertical to the surface normal of the screen 43 from every layer. This is indicated in FIG. 2 by speckles 92 at a greater depth. The diameter of the speckles will hardly differ from that at the surface, since S changes only slightly with typical screen thicknesses d in the millimeter range and distances from the screen in the order of magnitude of meters according to the formula indicated above. However, the position of the speckles can differ in different observed depth. FIG. 9 shows the unfavorable case in which a deeper speckle 92 and a speckle 92 at the surface would lie on top of one another as viewed from the screen.

For reducing speckle, the depth d is selected so as to be great enough that the light of speckles 92 that is generated from greater depths in the screen 43 also strikes the surface in local areas of interference minima, so that the contrast is blurred. That is, the light from speckles generated deeper in the screen 43 should fall back approximately up to half of the average speckle distance d.

The distribution of the light with total intensity I falling back from a greater depth d until the surface of the screen d can be formulated for every scattering angle θ of a scattering angle distribution f(θ) standardized to 1 for a scattering body 69 as follows:

$$\frac{I \cdot f(\theta)}{x^2},$$

where x is the path length of the light from the scattering body 67 to the surface. At an angle θ and very small thicknesses d at which further scattering of the light falling back at the surface need not be taken into account, x can be represented as $$\frac{d}{\cos\theta}.$$

An effective speckle reduction due to additional light in the interference minima at ½ between the surface speckles 92 results when, in accordance with FIG. 9, the mean scattering angle distribution is $$\langle\tan\theta\rangle \approx \frac{b}{2d},$$

that is, the following equation can be formulated roughly:

$$d_{crit} = \frac{b}{2\langle\tan\theta\rangle},$$

where the mean value for tanθ is calculated by the following equation:

$$\langle\tan\theta\rangle = \int_{-\frac{\pi}{2}}^{+\frac{\pi}{2}} f(\theta)\tan\theta\sin\theta d\theta,$$

and the integration $$\int_{-\frac{\pi}{2}}^{+\frac{\pi}{2}} \ldots \sin\theta d\theta$$

is the solid angle integral over a half-sphere for the scattering in the surface direction.

Accordingly, a screen thickness $d_{crit}$ is defined starting from which a reduction in speckle can be expected. With greater layer thicknesses, the speckles are further reduced, since the light component then provides a further reduction in contrast between intensity maxima and intensity minima by not inconsiderable contributions from deeper layers.

In the case where $D^2 > \lambda S$, the speckle given by the finite beam diameter D is smaller than the beam diameter D itself. It is then expected that the beam diameter D substantially determines the speckle size; consequently, an estimate can be used for b which relies on the fact that b is approximately twice the speckle diameter. Namely, in individual structures, the interference is very blurred, so that the function course can be approximated by simple sine and cosine functions. The distance between two maxima is then approximately equal to twice the width of a maximum. It follows from this that $$d > \frac{\lambda \cdot S\langle\tan\theta\rangle}{D}$$

should be selected to effectively reduce speckle phenomena.

Figure 10:
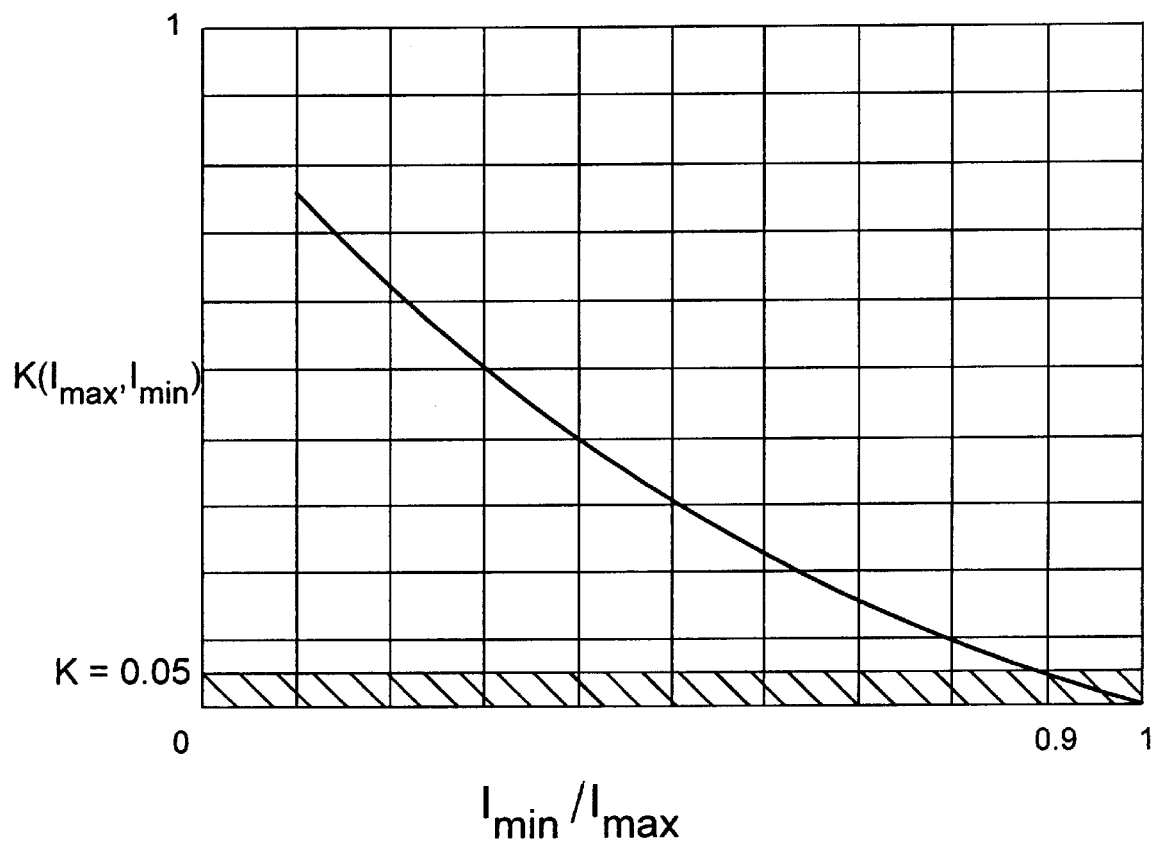
FIG. 10 is a graph showing contrast as function of the ratio of the light intensity in the interference maximum to the light intensity in the interference minimum.

The concept of contrast has already been mentioned a number of times in the preceding. The speckle contrast K at a thickness d is defined hereinafter as $$K(d) = \frac{I_{max} - I_{min}}{I_{max} + I_{min}},$$

where $I_{max}$ is the light intensity in a speckle and $I_{min}$ is the light intensity in an interference minimum. This quantity is plotted in FIG. 10 as a function of the ratio $$\frac{I_{min}}{I_{max}}.$$

The graph shows that when $I_{min}$ increases, that is, with increasing thickness d, on the basis of which the interference phenomena are still more "blurred" by light from greater depths, the contrast is drastically reduced.

It has turned out that with contrast function values K(d) of less than 0.2 and in particular less than or equal to 0.05, the speckle contrast is no longer physiologically perceptible.

Thus, if it is desired not only to reduce speckle, but to completely eliminate it physiologically, the contrast value K(d) can thus be measured in dependence on thickness and the thickness d of the screen 43 is then selected such that K(d) is less than 0.2 and, in particular, less than 0.05.

A less costly method, described hereinafter, for an approximate determination of the optimum layer thickness uses contrast with the critical thickness $d_{crit}$. To determine the contrast $K(d_{crit})$, this value is either estimated mathematically using the above considerations with the critical layer thickness $d_{crit}$, wherein reflection and multiple scattering of the light bundle 50 proceeding from the scattering bodies, which has so far not been considered, must now be taken into account, or the contrast $K(d_{crit})$ is simply measured with the critical density $d_{crit}$.

Since contrast values K multiply by approximation, the total contrast is then:

$$K(d) \cong K(d_{crit})^{\frac{d}{d_{crit}}}.$$

Accordingly, an estimation is easily given for the thickness at which contrast is no longer physiologically detectable, that is:

$$d \cong d_{crit} \cdot \frac{\log f}{\log K(d_{crit})},$$

where f is a number describing the extent to which the contrast of the speckles is to be suppressed in the screen 43. Thus, according to the above considerations, f is a number less than 0.2 and in particular less than or equal to 0.05 if the speckle contrast should be below the threshold of perception.

The examples given above show that a large number of possibilities for reducing speckle are provided according to the invention. In this connection, it is important that the path length of individual photons is adapted to the coherence length. In order to obtain the most advantageous values of the coherence length suitable under practical conditions, these values can be configured for the desired conditions by the choice of lasers 10, 20, 30 or pulse times or also by means of a second structure.

While the foregoing description and drawings represent the present invention, it will be obvious to those skilled in the art that various changes may be made therein without departing from the true spirit and scope of the present invention.

What is claimed is:

1. A device comprising:
    a laser for image presentation in which the laser emits laser light of a defined coherence length L at a given wavelength λ, said laser light having a predetermined path; and
    a first structure arranged in the path of the laser light with which phase displacements can be carried out for individual photons of the laser light in accordance with a predetermined distribution;
    wherein the average path given by the ratio of the average root mean square of the phase displacements formed by the distribution and the magnitude of the wave vector $k=2\pi/\lambda$ of the laser is greater than the coherence length L multiplied by a factor of $1/(12)^{1/2}$.

2. The device according to claim 1, wherein the first structure is formed of transparent material containing stochastically enclosed particles of a granulate with an elevated refractive index compared with the surrounding material, wherein the phase displacements are generated due to these differences in the refractive index.

3. The device according to claim 2, wherein the difference in the refractive index of the particles relative to the surrounding material is greater than 0.1.

4. The device according to claim 3, wherein the particles of the granulate comprise at least two phases having different refractive indices.

5. The device according to claim 4, wherein the extension of at least one region between two phase boundaries in the direction of the path of the laser light is less than 20 wavelengths.

6. The device according to claim 5, wherein said extension is less than 2 wavelengths.

7. The device according to claim 2, wherein the particles in the light propagation direction are smaller than 0.5 mm.

8. The device according to claim 7, wherein at least some of the particles are smaller than 0.1 mm.

9. The device according to claim 1, wherein the first structure contains mirrors for increasing the phase displacements by way of lengthening the path length of the laser light.

10. The device according to claim 1, wherein a screen is provided for presenting the image, and wherein the first structure is the screen itself or is constructed as a layer of the screen.

11. The device according to claim 1, wherein the laser has an amplification bandwidth of greater than 100 GHz and greater than 300 GHz.

12. The device according to claim 1, wherein the laser is a pulsed laser which can be operated with a pulse time of less than 10 ps pulse width.

13. The device according to claim 12, wherein it has a laser for red, blue and/or green light, and wherein a pulsed laser is provided for at least one of these colors, wherein this pulsed laser can be operated with a pulse width that is less than 4 ps and especially less than 2 ps if this laser emits red light;

3 ps and especially less than 1.5 ps if this laser emits green light;

2 ps and especially less than 1 ps if this laser emits blue light.

14. The device according to claim 1, wherein a second structure is provided by means of which, based on local quantum mechanical disturbances of photons in the laser beam the coherence length can be shortened, particularly by means of increasing a spectral width Δλ of the wavelength spectrum of the laser.

15. The device according to claim 1, wherein a laser is provided for red, green and/or blue light, and wherein the spectral width Δλ for the individual colors is as follows:

Δλ>1.3 nm for red light;
   Δλ>0.9 nm for green light;
   Δλ>0.75 nm for blue light.

16. The device according to 1, wherein the first structure is made at least in part from PTFE.

17. The device according to claim 1 with a laser and a screen for image presentation, wherein this screen or a layer of this screen has a plurality of scattering particles, wherein the thickness d of the screen or of the layer, as determined in the propagation direction of a laser beam emitted by the laser for imaging, is greater than a critical thickness $d_{crit}$ which is calculated from the mean distance b from interference maxima, known as speckle, generated by the laser beam at a surface of the layer or of the screen as:

$$d_{crit} = \frac{b}{2\langle \tan(\theta) \rangle},$$

where (tanθ) is the mean value of the tangent of the scattering angle θ for a scattering angle distribution characterizing the deflection of the laser beam at the particles.

18. The device according to claim 17, wherein at a distance S of the screen from the laser and with a diameter D and centroid wavelength λ of the laser light emitted by the laser the equation $D^2 > \lambda S$ is true and the thickness or layer thickness is greater than $$\frac{\lambda S}{D \langle \tan \theta \rangle}.$$

19. The device according to claim 17, wherein a thickness d at which a function course of a contrast magnitude K(d) assumes a value of less than 0.20 and, especially, less than or equal to 0.05 depending on the thickness d, wherein this function course of the contrast value is measurable as $$K(d) = \frac{I_{max} - I_{min}}{I_{max} + I_{min}}$$

over the occurring maximum light intensity $I_{max}$ and minimum light intensity $I_{min}$ in an area which is uniformly illuminated by the laser beam at a respective layer thickness d on a surface of the screen.

20. The device according to claim 17, wherein the thickness is equal to $$d_{crit} \cdot \frac{\log f}{\log K(d_{crit})},$$

where f is a number less than 0.20 and, in particular, less than or equal to 0.05 and $$K(d_{crit}) = \frac{I_{max} - I_{min}}{I_{max} + I_{min}},$$

is the maximum light intensity and $I_{min}$ is the minimum light intensity within a region on a screen which is uniformly illuminated by the laser on a screen with thickness $d_{crit}$.

21. The device according to claim 17, wherein the screen is made of PTFE and the thickness d is greater than 0.1 mm.

22. The device according to claim 21, wherein the thickness d is greater than 1 mm.

23. The device of claim 21, wherein the thickness d is greater than 3 mm.

24. The device according to claim 17, wherein the light of the laser has a coherence length L and the thickness D is greater than or equal to $$d = (0.04 \text{ cm} * L)^{1/2} \pm 25\%.$$

* * * * *